(12) United States Patent
Endo et al.

(10) Patent No.: US 10,848,343 B2
(45) Date of Patent: Nov. 24, 2020

(54) COMMUNICATION DEVICE, COMMUNICATION SYSTEM, COMMUNICATION METHOD, AND PROGRAM

(71) Applicant: Mitsubishi Electric Corporation, Tokyo (JP)

(72) Inventors: Hiroaki Endo, Tokyo (JP); Masahiro Ishihara, Tokyo (JP); Yohei Miyaura, Tokyo (JP); Yoshiro Murakami, Tokyo (JP); Yasushi Kuwabara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/325,875

(22) PCT Filed: Nov. 11, 2016

(86) PCT No.: PCT/JP2016/083491
§ 371 (c)(1),
(2) Date: Feb. 15, 2019

(87) PCT Pub. No.: WO2018/087875
PCT Pub. Date: May 17, 2018

(65) Prior Publication Data
US 2020/0021461 A1    Jan. 16, 2020

(51) Int. Cl.
*H04L 12/40* (2006.01)
*H04L 12/403* (2006.01)
*H04L 12/24* (2006.01)

(52) U.S. Cl.
CPC ...... *H04L 12/40013* (2013.01); *H04L 12/403* (2013.01); *H04L 41/12* (2013.01)

(58) Field of Classification Search
CPC . H04L 12/40013; H04L 41/12; H04L 12/403; H04L 41/0663; H04L 69/14;
(Continued)

(56) References Cited

U.S. PATENT DOCUMENTS 9,519,337 B2 *  12/2016  Itou .................. G06F 1/3293
9,621,416 B2 *  4/2017  Sakama ............ H04L 41/0806
(Continued)

FOREIGN PATENT DOCUMENTS

| JP | S62-198241 A | 9/1987 |
|---|---|---|
| JP | 2001-045054 A | 2/2001 |
| JP | 2011-029729 A | 2/2011 |

OTHER PUBLICATIONS

Office Action dated Oct. 28, 2019 issued in corresponding AU patent application No. 2016429466.
(Continued)

*Primary Examiner* — Sharad Rampuria
(74) *Attorney, Agent, or Firm* — Posz Law Group, PLC

(57) ABSTRACT

In a communication device, a communicator communicates with a communication counterpart using a first communication mode or a second communication mode. When a communication by the communicator with the communication counterpart using the second communication mode is reset due to a first cause, if the communication with the communication counterpart using the second communication mode is acceptable, a communication controller causes the communicator to resume communication with the communication counterpart using the second communication mode, and if the communication with the communication counterpart using the second communication mode is unacceptable, the communication controller causes the communicator to start a communication with the communication counterpart using the first communication mode. When the communication by the communicator with the communication counterpart using the second communication mode is reset due to a second cause, the communication controller causes the communicator to resume communication with the
(Continued)

communication counterpart using the second communication mode.

19 Claims, 6 Drawing Sheets

(58) Field of Classification Search
CPC ... H04L 69/24; H04L 69/40; H04L 12/40176; H04L 12/40045; H04L 12/10; H04L 41/04; H04L 41/085; H04L 45/02; G06F 13/00; H04W 84/18
See application file for complete search history.

(56) References Cited

U.S. PATENT DOCUMENTS

| | | | |
|---|---|---|---|
| 2003/0076221 A1* | 4/2003 | Akiyama | H04L 12/40182 340/12.32 |
| 2011/0019762 A1 | 1/2011 | Tsubota | |
| 2012/0173900 A1* | 7/2012 | Diab | H04L 12/40045 713/310 |

OTHER PUBLICATIONS

Office Action dated Jan. 9, 2020 issued in corresponding AU patent application No. 2016429466.
International Search Report of the International Searching Authority dated Jan. 31, 2017 for the corresponding International application No. PCT/JP2016/083491 (and English translation).
Extended European Search Report dated Aug. 2, 2019 issued in corresponding EP patent application No. 16921451.7.

* cited by examiner

COMMUNICATION MODE STORAGE 280

| SETTING | COMMUNICATION MODE |
|---|---|
| ✓ | FIRST COMMUNICATION MODE |
|  | SECOND COMMUNICATION MODE |

SYSTEM CONFIGURATION STORAGE 290

| COMMUNICATION COUNTERPART | COMMUNICATION ADDRESS |
|---|---|
| INDOOR UNIT 30a | xxx.xxx.xxx.01 |
| INDOOR UNIT 30b | xxx.xxx.xxx.02 |

COMMUNICATION DEVICE, COMMUNICATION SYSTEM, COMMUNICATION METHOD, AND PROGRAM

CROSS REFERENCE TO RELATED APPLICATION

This application is a U.S. national stage application of International Patent Application No. PCT/JP2016/083491 filed on Nov. 11, 2016, the content of which is incorporated herein by reference.

TECHNICAL FIELD

The present disclosure relates to a communication device, a communication system, a communication method, and a program.

BACKGROUND

Technology for communicating with a communication counterpart in a communication system where multiple communication modes are mixedly used is known.

For example, Patent Literature 1 discloses a system for transferring data between devices connected by multiple communication lines. In the system disclosed in Patent Literature 1, a transmission-side device retains a last choice communication line through which transmission data is transmitted and transmits, to a receiving-side device, transmission data of the same processing series by using the same communication line. In doing so, transmission performance can be improved because the passing-over of data caused by data being transmitted with communication lines with differing capabilities can be eliminated.

Also, Patent Literature 2 discloses a device that automatically switches communication formats between communication devices. The communication device disclosed in Patent Literature 2, upon start-up of a system, uses a predetermined standardized second communication format to transmit data indicating content of a first communication format that enables more efficient communication. Upon confirmation that, based on the result of the transmission using the second format, communication using the first communication format is acceptable, the communication device switches to performing communication using the first communication format. In doing so, the appropriate communication mode can be selected at start-up of the communication device.

Patent Literature 1: Unexamined Japanese Patent Application Kokai Publication No. 2001-45054
Patent Literature 2: Unexamined Japanese Patent Application Kokai Publication No. S62-198241

In the system disclosed in Patent Literature 1, multiple communication lines between the transmission-side device and the receiving-side device can be effectively used to perform communication. However, Patent Literature 1 does not disclose about processing performed when the communication is reset. With respect to this, although the communication device disclosed in Patent Literature 2 can select the appropriate communication mode when the system starts-up, each time start-up is performed, the communication device disclosed in Patent Literature 2 executes processing to confirm whether or not communication is acceptable using the first communication format. Therefore, there is an issue in that establishing communication is time-consuming In consideration of the aforementioned issue, an objective of the present disclosure is to provide a device such as a communication device that is able to quickly resume communication with a communication counterpart when communication with the communication counterpart is reset in a communication system in which multiple communication modes are mixedly used.

SUMMARY

In order to achieve the aforementioned objective, a communication device of present disclosure includes:
communication means for communicating with a communication counterpart using a first communication mode or a second communication mode; and
communication control means, wherein
when a communication by the communication means with the communication counterpart using the second communication mode is reset due to a first cause, and
if the communication with the communication counterpart using the second communication mode is acceptable, the communication control means causes the communication means to resume the communication with the communication counterpart using the second communication mode, and
if the communication with the communication counterpart using the second communication mode is unacceptable, the communication control means causes the communication means to start a communication with the communication counterpart using the first communication mode, and
when the communication by the communication means with the communication counterpart using the second communication mode is reset due to a second cause, the communication control means causes the communication means to resume the communication with the communication counterpart using the second communication mode.

In the present disclosure, the communication device, when a communication with the communication counterpart using the second communication mode is reset due to a first cause, and if the communication with the communication counterpart using the second communication mode is acceptable, the communication device resumes the communication with the communication counterpart using the second communication mode, and if the communication with the communication counterpart using the second communication mode is unacceptable, the communication device starts a communication with the communication counterpart using the first communication mode, and when the communication with the communication counterpart using the second communication mode is reset due to a second cause, the communication device resumes the communication with the communication counterpart using the second communication mode. Therefore, according to the present disclosure, the communication can be quickly resumed with the communication counterpart when communication with the communication counterpart is reset in a communication system in which multiple communication modes are mixedly used.

DETAILED DESCRIPTION

Embodiments of the present disclosure are described below in detail with reference the drawings. Throughout the drawings, components that are the same or equivalent are assigned the same reference signs.

Embodiment 1

Figure 1:
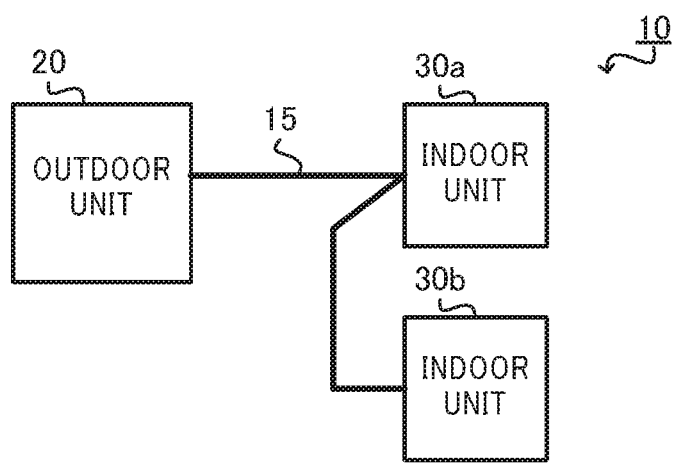
FIG. 1 is a diagram illustrating an overall configuration of an air-conditioning system according to Embodiment 1 of the present disclosure.

FIG. 1 illustrates an overall configuration of an air-conditioning system 10 according to Embodiment 1, and the air-conditioning 10 functions as a communication system of the present disclosure. The air-conditioning system 10 is installed in an architectural structure such as a typical family dwelling, a multi-unit household complex, a facility, a building, and factory, and is a system that performs air conditioning in an air-conditioning area that is a target space to be air conditioned. The term "air conditioning" means adjusting of temperature, humidity, purity, and/or flow of air in the air-conditioning area. Specifically, air conditioning includes actions such as heating, cooling, dehumidifying, humidifying, purifying, and the like.

The air-conditioning system 10 is an air-conditioning system on which a vapor-compression type heat pump is mounted and is a convection-type air-conditioning system that performs air conditioning in the air-conditioning area by circulating air that is temperature adjusted in indoor units 30a and 30b. The air-conditioning system 10 runs by being provided power from a non-illustrated commercial power supply, photovoltaic power generator, power storage equipment, or the like.

As illustrated in FIG. 1, the air-conditioning system 10 includes an outdoor unit 20 that is installed outdoors and the indoor units 30a and 30b that are installed indoors. The outdoor unit 20 and the indoor units 30a and 30b are connected to each other via a communication network 15 and a non-illustrated refrigerant line. As such, the air-conditioning system 10 is an air conditioning-system in which the indoor units 30a and 30b are connected to a single outdoor unit 20 using a multidrop scheme and is a dispersed arrangement-type air-conditioning system that can perform air conditioning in multiple air-conditioning areas using a single outdoor unit 20. Such kind of a dispersed arrangement-type air conditioning system is also referred to as a multi-type air conditioning system and a multi-air conditioner, for example The quantity of indoor units 30a and 30b is not limited to two units. The quantity of indoor units 30a and 30b may be freely determined.

The outdoor unit 20 is installed in a location outside of the air-conditioning area, and is typically installed outdoors. The outdoor unit 20 is a device that performs heat exchange between outdoor air and refrigerant. The outdoor unit 20 functions as a communication device that communicates with the two indoor units 30a and 30b as communication counterparts.

Figure 2:
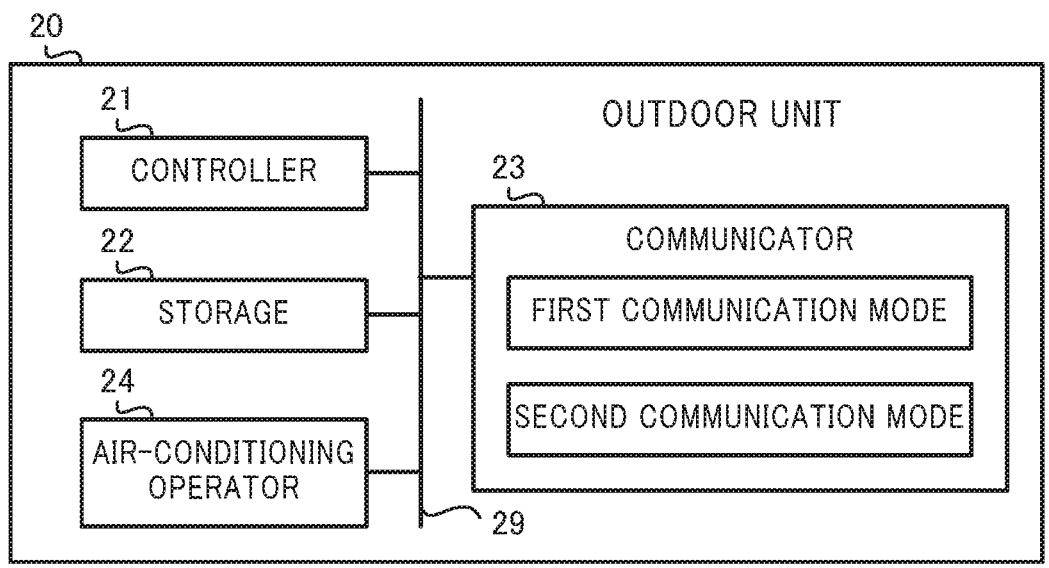
FIG. 2 is a block diagram illustrating a hardware configuration of an outdoor unit.

FIG. 2 illustrates a configuration of the outdoor unit 20. The outdoor unit 20, as illustrated in FIG. 2 includes a controller 21, a storage 22, a communicator 23, and an air-conditioning operator 24. These components are also respectively referred to as a first controller, a first storage, a first communicator, and a first air-conditioning operator. These components are connected to one another via a bus 29.

The controller 21 includes components such as a central processing unit (CPU), a read-only memory (ROM), a random-access memory (RAM), and a real-time clock (RTC), all of which are non-illustrated. The controller 21 is a calculator that performs various calculations regarding control of the outdoor unit 20. The CPU is also referred to as a central processor, a central calculator, a processor, a microprocessor, a microcomputer, a digital signal processor (DSP), or the like. The controller 21 performs overall control of the outdoor unit 20 by the CPU reading a program and data stored in the ROM and using the RAM as a working area.

The storage 22, for example, is a nonvolatile semiconductor memory such as a flash memory, an erasable programmable ROM (EPROM), an electrically erasable programmable ROM (EEPROM), or the like, and acts as a so-called secondary storage device (auxiliary storage device). The storage 22 stores various types of programs and data used by the controller 21 for various types of processing, as well as various types of data generated or acquired by the controller 21 performing the various types of processing. The programs and the data contents stored in the storage 22 are retained even if the main power supply of the outdoor unit 20 turns off.

The communicator 23 includes a predetermined communication interface and communicates, under control of the controller 21, individually with the indoor units 30a and 30b via the communication network 15. The communication network 15 is a network dedicated to communication between the air conditioners, equipment apparatuses, and the like and is a network in compliance with a known standard. The communication network 15 may be wired or wireless.

The communicator 23 includes a communication function of two different communication modes, one being a first communication mode and the other being a second communication mode. Communication is performed with a communication counterpart using the first communication mode or the second communication mode. The communication counterpart, specifically, is either one of the indoor unit 30a and the indoor unit 30b that are connected with the outdoor unit 20 via the communication network 15. The first communication mode and the second communication mode are, for example, an asynchronous serial communication mode (also referred to as "start-stop synchronization mode") of a Universal Asynchronous Receiver Transmitter (UART), a clock synchronous serial communication mode of a Serial Peripheral Interface (SPI), or the like.

The first communication mode and the second communication mode are communication modes with at least one mutually different characteristic such as a communication speed, a communication procedure, a communication format, or the like. Next, an example is described in which the first communication mode and the second communication mode are communication modes with different communication speeds. More specifically, the first communication mode is a communication mode of a version that is older than that of the first communication mode, and is a communication mode that is slow relative to the second communication mode. Conversely, the second communication mode is a communication mode of a version that is newer than the first communication mode, and is a communication mode that is fast relative to the first communication mode. In order for the communicator 23 to have upward compatibility enabling communication with apparatuses that do not support the second communication mode, the communicator 23 has a function that enables two-way communication between the first communication mode that is the old version and the second communication mode that is the new version. The first communication mode is also referred to as the conventional communication mode and the second communication mode is also referred to as the new communication mode.

The communicator 23 uses the first communication mode and the second communication mode exclusive of each other. In other words, the communicator 23 does not communicate using the first communication mode and the second communication mode at the same time. Rather, the communicator 23 communicates with the indoor units 30a and 30b via one of the communication modes selected beforehand by the controller 21 from among the first communication mode and the second communication mode.

In a case in which the communication mode selected from among the first communication mode and the second communication mode is the same as that of the communication counterpart, communication can be carried out properly. More specifically, in a case in which the communicator 23 transmits data using the first communication mode, as long as the first communication data mode is selected by the communication counterpart, namely the indoor unit 30a or the indoor unit 30b, the data can be received. However, if the second communication mode is selected by the communication counterpart, the data cannot be received properly. Here, in the case in which the transmitted data cannot be received properly, a communication error occurs and the transmitted data does not arrive at the communication counterpart, arrives as invalid data, or the like. Likewise, in a case in which the communicator 23 transmits data using the second communication mode, if the second communication mode is not selected by the indoor unit 30a or the indoor unit 30b, which are the communication counterparts, the transmitted data cannot be received properly.

The air-conditioning operator 24 is a component for accomplishing fundamental functions of the outdoor unit 20. More specifically, the air-conditioning operator 24 includes, for example, a compressor that compresses refrigerant flowing through a refrigerant line, an outdoor heat-exchanger that exchanges heat with refrigerant and outdoor air, an outdoor air blower that takes in outdoor air and provides the air to the heat-exchanger, an expansion valve that depressurizes refrigerant and causes the refrigerant to expand, and a four-way valve for changing the direction in which the refrigerant flows through the refrigerant line, all of which are non-illustrated. These components, namely the compressor, the outdoor heat-exchanger, the expansion valve, and the four-way valve are connected to an indoor heat-exchanger of each of the indoor units 30a and 30b in a ring-like arrangement by the non-illustrated refrigerant line. In this manner, the heat pump (refrigeration cycle) is formed. The air-conditioning operator 24, under control of the controller 21, cooperatively operates with the indoor units 30a and 30b via the communication network 15 to perform air conditioning in the air-conditioning area.

Next, the configuration of the indoor units 30a and 30b is described. Each of the indoor units 30a and 30b is installed in a location where temperature-adjusted air can be provided to the air-conditioning area. The air-conditioning area is heated or cooled by hot air or cold air blown out by the indoor units 30a and 30b. The indoor unit 30a is a first indoor unit and functions as a first communication counterpart device of the outdoor unit 20, whereas the indoor unit 30b is a second indoor unit that functions as a second communication counterpart device of the outdoor unit 20. The indoor units 30a and 30b function in the same manner Hereinafter, when the indoor unit 30a and the indoor unit 30b are referred to generally without distinguishing between the two, the following general term "indoor unit 30" is used instead.

Figure 3:
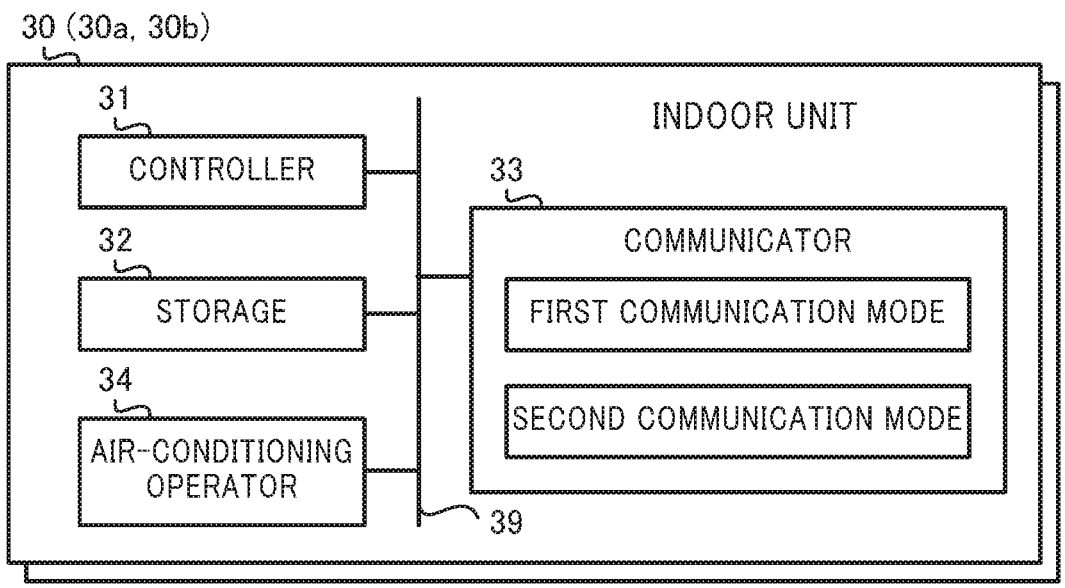
FIG. 3 is a block diagram illustrating a hardware configuration of an indoor unit.

FIG. 3 illustrates a configuration of the indoor unit 30 (each of the indoor units 30a and 30b). As illustrated in FIG. 3, the indoor unit 30 includes the controller 31, the storage 32, the communicator 33, and the air-conditioning operator 34. These components are also respectively referred to as a second controller, a second storage, a second communicator, and a second air-conditioning operator. These components are connected to one another via a bus 39.

The controller 31 includes components such as a CPU, a ROM, a RAM, and an RTC, all of which are non-illustrated. The controller 31 is a calculator that performs various calculations regarding control of the indoor unit 30. The CPU is also referred to as a central processor, a central calculator, a processor, a microprocessor, a microcomputer, a DSP, or the like. The controller 31 performs overall control of the indoor unit 30 by the CPU reading a program and data stored in the ROM and using the RAM as a working area.

The storage 32, for example, is a nonvolatile semiconductor memory such as a flash memory, EPROM, and EEPROM, or the like, and acts as a so-called secondary storage device (auxiliary storage device). The storage 32 stores various types of programs and data used by the controller 31 for various types of processing, as well as various types of data generated or acquired by the controller 31 performing the various types of processing. The programs and the data contents stored in the storage 32 are retained even if the main power supply of the indoor unit 30 turns off.

The communicator 33 includes a communication function of two different communication modes, one being a first communication mode and the other being a second communication mode. The first communication mode communicates with a communication counterpart using the second communication mode. The communication counterpart, specifically, is the outdoor unit 20 that is connected to the indoor unit 30 via the communication network 15. Similar to the first communication mode and the second communication mode of the communicator 23 of the outdoor unit 20, the first communication mode and the second communication mode of the communicator 33 are, for example, an asynchronous serial communication mode of a UART, a clock synchronous serial communication mode of an SPI, or the like.

As described above, the first communication mode is a communication mode of the first communication mode is a communication mode of a version that is older than that of the first communication mode, and is a communication mode that is slow relative to the second communication mode. Conversely, the second communication mode is a communication mode of a version that is newer than the first communication mode, and is a communication mode that is fast relative to the first communication mode. The communicator 33 has a function that enables two-way communication between the first communication mode that is the old version and the second communication mode that is the new version.

The communicator 33, similar to the communicator 23 of the outdoor unit 20, uses the second communication mode exclusive of each other. In other words, the communicator 33 does not communicate using the first communication mode and the second communication mode at the same time. Rather, the communicator 33 communicates with the outdoor unit 20 via one of the communication modes selected beforehand by the controller 31 from among the first communication mode and the second communication mode. In a case in which the communication mode selected from among the first communication mode and the second communication mode is the same as that of the outdoor unit 20, communication can be carried out properly.

The air-conditioning operator 34 is for accomplishing fundamental functions of the indoor unit 30. More specifically, the air-conditioning operator 34 includes components such as an indoor heat-exchanger that exchanges heat between the refrigerant that flows through the refrigerant line and the air in the air-conditioning area and an indoor air blower that blows into the air-conditioning area air that is heat exchanged by the indoor heat-exchanger, both of which are non-illustrated. The air-conditioning operator 34, under control of the controller 31, cooperatively operates with the air-conditioning operator 24 of the outdoor unit 20 via the communication network 15 to perform air conditioning in the air-conditioning area.

A user of the air-conditioning system 10 can, for example, transmit operation commands such as "cooling", "dehumidifying", "heating", and "humidifying" to a desired indoor unit from among the two indoor units 30a and 30b by operating a remote controller that functions as a user interface of the air-conditioning system 10. The operation command transmitted from the remote controller is transferred from the indoor unit 30a or the indoor unit 30b to the outdoor unit 20 via the communication network 15.

For example, in a case in which a command for a "cooling" or "humidifying" operation is performed, the controller 21 of the outdoor unit 20 switches the flow route of four-way valve, opens the expansion valve, and drives the compressor such that refrigerant that is discharged from the compressor flows to the outdoor heat-exchanger. Upon driving the compressor, the refrigerant discharging from the compressor flows to the outdoor heat-exchanger where the refrigerant is heat-exchanged with the outdoor air thereby cooling the refrigerant. The refrigerant cooled by the outdoor heat-exchanger is depressurized by the expansion valve. Thereafter, the refrigerant flows to the indoor heat-exchanger where the refrigerant is heat-exchanged with the indoor air thereby heating the refrigerant. The refrigerant that is heated by the indoor heat-exchanger is taken into the compressor again. In this manner, low-pressure and low-temperature refrigerant flows through the line of the indoor heat-exchanger, and because the surface of the indoor heat-exchanger is low in temperature, the indoor air is cooled when passing over the surface of the indoor heat-exchanger. The indoor air blower blows cold air passing through the indoor heat-exchanger to the air-conditioning area.

Conversely, in a case in which a command for a "heating" operation is performed, the controller 21 of the outdoor unit 20, switches the flow route of the four-way valve, opens the expansion valve, and drives the compressor such that the refrigerant that is discharged from the compressor flows to the indoor-heat exchanger. Upon driving the compressor, the refrigerant discharging from the compressor flows to the indoor heat-exchanger where the refrigerant is heat-exchanged with the indoor air thereby cooling the refrigerant. The refrigerant cooled by the indoor heat-exchanger is depressurized by the expansion valve. Thereafter, the refrigerant flows to the outdoor heat-exchanger where the refrigerant is heat-exchanged with the outdoor air thereby heating the refrigerant. The refrigerant heated by the outdoor heat-exchanger is taken into the compressor again. In this manner, the high-temperature and high-pressure refrigerant flows through the line of the indoor heat-exchanger, and because the surface of the indoor heat-exchanger is high in temperature, the indoor air is heated when passing over the surface of the indoor heat-exchanger. The indoor air blower blows hot air passing through the indoor heat-exchanger to the air-conditioning area.

In the air-conditioning system 10 that includes these air-conditioning functions, the single outdoor unit 20 and the two indoor units 30a and 30b communicate in a master-slave mode where the outdoor unit 20 is the master device and the indoor units 30a and 30b are the slave devices. As described above, the air-conditioning system 10 mixedly uses two communication modes, namely the first communication mode and the second communication mode. Therefore, the outdoor unit 20 and the indoor units 30a and 30b communicate by selection of a communication mode to be used from among the first communication mode and the second communication mode. Next, the functions of the outdoor unit 20 and the indoor units 30a and 30b are described in detail.

Figure 4:
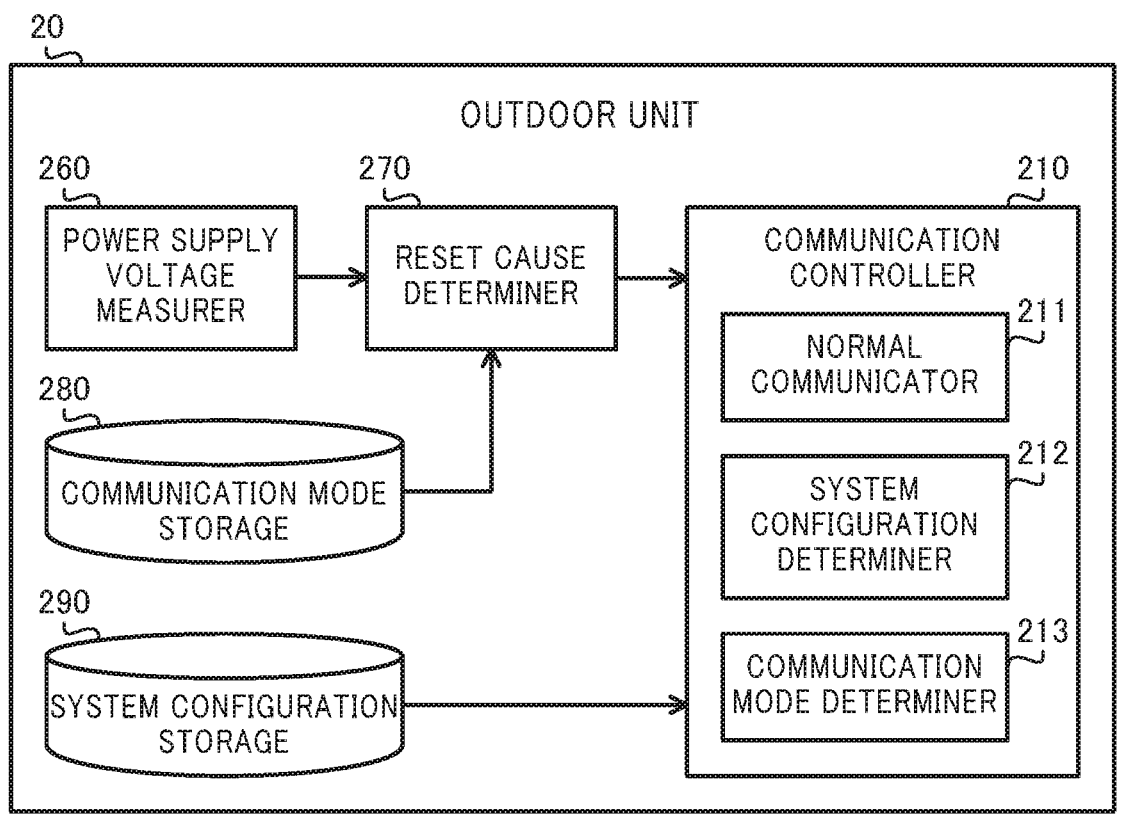
FIG. 4 is a diagram illustrating a functional configuration of the outdoor unit.

FIG. 4 illustrates a functional configuration of the outdoor unit 20. As illustrated in FIG. 4, the outdoor unit 20 includes a communication controller 210, a power supply voltage measurer 260, and a reset cause determiner 270. Each of these functions is achieved by software, firmware, or a combination of software and the firmware. The software and firmware are recorded as programs and are stored in the storage 22 or the ROM. The controller 21 achieves the functions of each of the components by the CPU executing the programs stored in the ROM or the storage 22.

The communication controller 210 controls the communicator 23 causing the communicator 23 to communicate with the indoor unit 30a and to communicate with the indoor unit 30b, both of which are communication counterparts. As illustrated in FIG. 4, the communication controller 210 includes functions of a normal communicator 211, a system configuration determiner 212, and a communication mode determiner 213. The functions of the communication controller 210 are achieved by the controller 21 in cooperation with the communicator 23.

The normal communicator 211 causes the communicator 23 to execute normal communication with the indoor unit 30a and normal communication with indoor unit 30b by either the first communication mode or the second communication mode. More specifically, the communicator 23, under the control of the normal communicator 211, transmits and receives information that is necessary for control of the air-conditioning system 10 to and from each indoor unit 30. For example, the communicator 23 acquires, from each indoor unit 30, status information indicating an operation status such as whether operation of the indoor unit 30 is underway or stopped, information indicating an operation mode such as heating, cooling, or air-blowing, and the like.

Also, the communicator 23 acquires from each indoor unit 30, settings information including the temperature, humidity, and airflow velocity or sets the operation conditions of each indoor unit 30 by transmitting such kind of settings information to each indoor unit 30. Furthermore, the communicator 23 acquires from each indoor unit 30, information including the take-in temperature, humidity, and the like of each indoor unit 30 and measurement values obtained by various sensors.

Also, as illustrated in FIG. 4, the outdoor unit 20 includes a communication mode storage 280 and a system configuration storage 290. The communication mode storage 280 and the system configuration storage 290 reside in a storage region within the storage 22.

The communication mode storage 280 stores a communication mode when communication of the communicator 23 is reset. In other words, the communication mode storage 280 stores information indicating whether the communication mode in use by the communicator 23, when the communicator 23 is reset, is either the first communication mode or the second communication mode.

Figures 5, 6, 7:
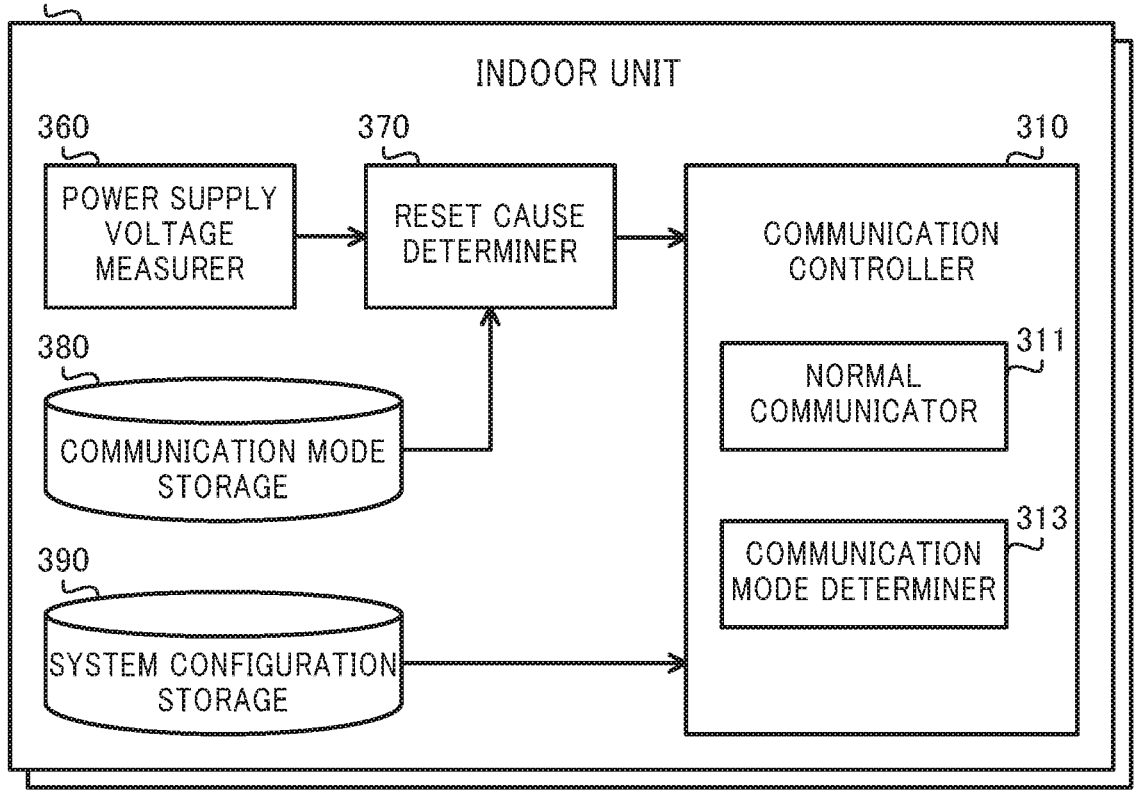
FIG. 5 is a diagram illustrating an example of information that is stored in a communication mode storage.
FIG. 6 is a diagram illustrating an example of information stored in a system configuration storage.
FIG. 7 is a diagram illustrating a function configuration of the indoor unit.

FIG. 5 illustrates an example of information that is stored in the communication mode storage 280. FIG. 5 illustrates an example in which the communication mode is the first communication mode when the communication of the communicator 23 is reset. If the communication mode to which the communicator 23 is currently set is the first communication mode, the communication controller 210 stores information indicating in the communication mode storage 280 that the first communication mode is set. If the current communication mode is the second communication mode, the communication controller 210 stores information indicating in the communication mode storage 280 that the second communication mode is set. The communication controller 210 executes such kind of storage processing each time the communication mode of the communicator 23 is switched.

When the communication of the communicator 23 is reset, the system configuration storage 290 stores a system configuration of the indoor unit 30 which is the communication counterpart. The system configuration is a configuration that is necessary for acquiring the quantity of units, communication addresses, and the like of the indoor unit 30, which is the communication counterpart, as information for establishing communication by the communicator 23.

FIG. 6 illustrates an example of information stored in the system configuration storage 290. As illustrated in FIG. 6, the system configuration storage 290 stores, as the system configuration, the communication addresses of the two indoor units 30a and 30b that exist as communication counterparts in the air-conditioning system 10. Upon establishing communication with the computer counterparts, the communication controller 210 saves information indicating, for example, the quantity of communication counterparts and the communication addresses of the communication counterparts, as the system configuration, in the system configuration storage 290.

The communication modes stored in the communication mode storage 280 and the information indicating the system configuration stored in the system configuration storage 290 are retained at the timing of reset and after reset. Also, after recovering from the reset, this information is referred to by the communication controller 210 as the communication mode in use when the reset occurred.

The functional configuration of the outdoor unit 20 illustrated in FIG. 4 is further described. The power supply voltage measurer 260 measures the power supply voltage of the outdoor unit 20. The power supply voltage of the outdoor unit 20 is the voltage of power supplied from the main power supply of the outdoor unit 20. The power supply voltage measurer 260 includes, for example, a capacitor, an analog/digital (A/D) conversion circuit that performs A/D conversion of voltage applied to the capacitor, and so on. The capacitor, the A/D conversion circuit, and so on, although non-illustrated, are connected between the power supply line and the ground. The power supply voltage measurer 260 measures the power supply voltage of the outdoor unit 20 by acquiring a voltage between the power supply line and the ground by the capacitor, A/D conversion circuit, and the like. The functions of the power supply voltage measurer 260 are achieved by the controller 21 in cooperation with the capacitor, the A/D conversion circuit, and the like.

The reset cause determiner 270 acquires the measurement value of the power supply voltage by the power supply voltage measurer 260 and determines, based on the measurement value of the power supply voltage, a cause of reset when the communication by the communicator 23 is reset. The expression, "communication reset by the communicator 23" means that the communication status of the communicator 23 returned to an initial state. When communication by the communicator 23 is reset, the communication setting established between the communicator 23 and the indoor unit 30 that is the communication counterpart is cleared. Therefore, when the communicator 23 is restarted, communication must be reestablished between the communicator 23 and the indoor unit 30.

When such a communication reset occurs, the reset cause determiner 270 determines the cause of the reset based on the power supply voltage measured by the power supply voltage measurer 260. The function of the reset cause determiner 270 is achieved by the controller 21 in cooperation with the storage 22, the communicator 23, and the like.

More specifically, the reset cause determiner 270 determines, based on the power supply voltage of the outdoor unit 20, whether the communication by the communicator 23 is reset due to a first cause or reset due to a second cause. Reset due to a first cause refers to a reset due to the main power supply of the outdoor unit 20 switching to off. When the main power supply of the outdoor unit 20 switches to off, the function of the communicator 23 stops because the function of the entirety device stops thereby clearing the established communication settings. In contrast to this, the reset by the second cause refers to a reset caused by a temporary drop in the power supply voltage. For example, in a case in which a sudden power outage occurs or in a case in which an abnormality occurs in the device and a watchdog timer detects the abnormality, the reset due to the second cause occurs.

Below, the reset due to the first cause (main power supply oft), is indicated using the notation Power on Reset (POR) and the reset by the second cause (temporary drop in power supply voltage) is indicated using the notation Watchdog Reset (WDR).

In a case in which the power supply voltage is below a specified value when communication by the communicator 23 is reset, the reset cause determiner 270 determines that communication by the communicator 23 is reset due to the first cause. In contrast to this, in a case in which the power supply voltage is greater than or equal to the specified value when communication by the communicator 23 is reset, the reset cause determiner 270 determines that communication by the communicator 23 is reset due to the second cause.

More specifically, while the outdoor unit 20 is restarting after the reset occurs, the reset cause determiner compares the value of the power supply voltage measured by the power supply voltage measurer 260 against the specified value. If in the comparison result, the power supply voltage is below the specified value, the reset cause determiner 270 determines that this reset occurred due to the first cause (main power supply oft), whereas if the power supply voltage is greater than or equal to the specified value, the reset cause determiner 270 determines that this reset occurred due to the second cause (temporary drop in power supply voltage). This specified value is pre-set and stored in the ROM, the storage 22, or the like.

In this manner, the reset cause determiner 270 determines the cause of the reset by referencing the power supply voltage immediately after the reset is cleared. Therefore, the communication controller 210 can refer to the cause of the reset without having to save into the storage 22 the comparison result by the reset cause determiner 270.

After communication by the communicator 23 is reset, the communication controller 210 determines the communication mode for restart in accordance with the cause of reset determined by the reset cause determiner 270 and the communication mode stored in the communication mode storage 280. Then, the communication controller 210 causes the communicator 23 to use the determined communication mode to communicate with the indoor unit 30.

First, the case in which communication by the communicator 23 is reset due to the first cause, that is, the temporary drop in the power supply voltage (POR), is described. In a case in which communication with the indoor unit 30 by the communicator 23 using the second communication mode is reset due to the first cause, if communication with the indoor unit 30 using the second communication mode is acceptable, the communication controller 210 causes the communicator 23 to resume communication with the indoor unit 30 using the second communication mode. Conversely, in the same case, if communication with the indoor unit 30 using the second communication mode is unacceptable, the communication controller 210 causes the communicator 23 to start communication with the indoor unit 30 using the first communication mode. Further, in a case in which communication with the indoor unit 30 by the communicator 23 using the first communication mode is reset to the first case, if communication with the indoor unit 30 using the second communication mode is acceptable, the communication controller 210 causes the communicator 23 to resume communication with the indoor unit 30 using the second communication mode. Conversely, in the same case, if communication with the indoor unit 30 using the second communication mode is unacceptable, the communication controller 210 causes the communicator 23 to start communication with the indoor unit 30 using the first communication mode.

Here, the expression "communication with the indoor unit 30 using the second communication mode is acceptable" means that the indoor unit 30 supports the second communication mode and that communication between the indoor unit 30 and the outdoor unit 20 can be established using the second communication mode. As described more specifically further below, regardless of whether the communication controller 210 successfully determines the system configuration of the indoor unit 30 via communication using the second communication mode or is unsuccessful at determining the system configuration of the indoor unit 30 via the second communication mode, the communication controller 210 determines that communication with the indoor unit 30 using the second communication mode is acceptable in a case in which the system configuration of the indoor unit 30 is successfully determined via the first communication mode and the indoor unit 30 supports the second communication mode.

In a case in which communication of the communicator 23 with the indoor unit 30 using the first communication mode or the second communication mode is reset due to the first cause, the communication controller 210 executes determination processing to determine whether or not communication with the indoor unit 30 using the second communication mode is acceptable. Then, the communication controller 210 uses, from among the first communication mode and the second communication mode, a communication mode determined in accordance with this determination processing to cause the communicator 23 to start communication with the indoor unit 30. As a function for executing this kind of determination processing, the communication controller 210 includes the system configuration determiner 212 that determines the system configuration of the indoor units 30a and 30b and the communication mode determiner 213 that determines the communication mode of the indoor units 30a and 30b.

In a case in which communication by the communicator 23 with the indoor unit 30 using the second communication mode is reset due to the first cause, the system configuration determiner 212 determines the system configuration of the indoor unit 30 via communication by the communicator 23 using the second communication mode. In the case in which the communication by the communicator 23 is reset due to the first cause (main power supply oft), the system configuration including the quantity of units, communication addresses, and the like of the communication counterparts may change before the reset is cleared. Therefore, after the reset is cleared, the system configuration determiner 212 determines the system configuration of the indoor unit 30 again and confirms whether or not there is a change in the system configuration, in order to resume communication with the indoor unit 30 using the second communication mode which is the same communication mode used just before the reset occurred. In doing so, the system configuration determiner 212 attempts to reestablish communication with the indoor unit 30 using the second communication mode.

In a case in which determination of the system configuration is successfully performed via communication using the second communication mode by the system configuration determiner 212, the communication controller 210 determines that communication with the indoor unit 30 using the second communication mode is acceptable. The expression "case in which determination of the system configuration is successfully performed via communication using the second communication mode" specifically means that all of the indoor units 30, which are communication counterparts, support the second communication mode and also that confirmation that the communication addresses of all of the indoor units 30 are properly set could be performed.

In the case in which determination of the system configuration of the indoor unit 30 is successfully performed, the communication controller 210 individually establishes communication with the respective indoor units 30a and 30b using the second communication mode. Then, the communication controller 210 functions as the normal communicator 211 and causes the communicator 23 to resume communication with the indoor units 30a and 30b using the second communication mode. The communicator 23 transmits and receives, via communication using the second communication mode, information necessary for control of the air-conditioning system 10 such as the previously-described status information, settings information, sensor measurement values, and the like, to and from the indoor units 30a and 30b.

Conversely, in the case in which determination of the system configuration of the indoor unit 30 via communication using the second communication mode is unsuccessful, the system configuration determiner 212 determines the system configuration of the indoor unit 30 via communication by the communicator 23 using the first communication mode. The expression "case in which determination of the system configuration via the communication using the second communication mode is unsuccessful" refers to, for example, cases such as (i) when an indoor unit 30 that does not support the second communication mode is added, (ii) when the indoor unit 30 supports the second communication mode but is using the first communication mode, and (iii) when the function of the indoor unit 30 is stopped.

For reasons such as those given, when communication with at least one of the units among the indoor units 30a and 30b cannot be properly performed using the second communication mode, the system configuration determiner 212 is unsuccessful at determining the system configuration using the second communication mode. In this case, when the system configuration determiner 212 is unsuccessful at determining the system configuration using the second communication mode, the system configuration determiner 212 reattempts determination of the system configuration using the first communication mode which is the conventional communication mode.

Also, even in a case in which communication by the communicator 23 with the indoor unit 30 using the first communication mode is reset due to the first cause, the system configuration determiner 212 determines the system configuration of the indoor unit 30 via communication by the communicator 23 using the first communication mode. More specifically, after the reset is cleared, the system configuration determiner 212 determines the system configuration of the indoor unit 30 again and confirms whether or not there is a change in the system configuration in order to resume communication with the indoor unit 30 using the first communication mode which is the same communication mode used just before the reset occurred. In doing so, the system configuration determiner 212 attempts to reestablish communication with the indoor unit 30 using the first communication mode.

After the system configuration determiner 212 determines the system configuration of the indoor unit 30 via communication using the first communication mode, the communication mode determiner 213 determines, via communication by the communicator 23 using the first communication mode, whether or not the indoor unit 30 supports the second communication mode. Here, the expression "the indoor unit 30 supports the second communication mode" means that the indoor unit 30 is provided with a function for communication using the second communication mode and that the second communication mode can be used.

The communication mode determiner 213 individually confirms the communication mode that the respective indoor units 30a and 30b support by communicating with each of the indoor units 30a and 30b using the first communication mode. In a case in which the communication mode determiner 213 receives a response from the indoor unit 30 indicating that the indoor unit 30 supports the second communication mode, the communication mode determiner 213 determines that the particular indoor unit 30 supports the second communication mode. Conversely, in a case in which a response is received from the indoor unit 30 indicating that the indoor unit 30 does not support the second communication mode, or in a case in which a response is not received from the indoor unit 30, the communication mode determiner 213 determines that the particular indoor unit 30 does not support the second communication mode.

In a case in which a determination is made by the communication mode determiner 213 that all of the indoor units 30a and 30b support the second communication mode, the communication controller 210 determines that communication with the indoor units 30a and 30b using the second communication mode is acceptable. In this case, the communication controller 210 individually establishes communication with the respective indoor units 30a and 30b using the second communication mode. Then, the communication controller 210 functions as the normal communicator 211 and causes the communicator 23 to start communication with the indoor units 30a and 30b using the second communication mode. The communicator 23 transmits and receives, via communication using the second communication mode, information necessary for control of the air-conditioning system 10, to and from the indoor units 30a and 30b.

Conversely, in a case in which a determination is made by the communication mode determiner 213 that at least one units among the indoor units 30a and 30b does not support the second communication mode, the communicator 23 cannot communicate with all of the indoor units 30a and 30b using the second communication mode. Therefore, in this case, the communication controller 210 determines that communication with the indoor units 30a and 30b using the second communication mode is unacceptable. When a determination is made that communication with the indoor units 30a and 30b using the second communication mode is unacceptable, the communication controller 210 establishes communication with the indoor units 30a and 30b using the first communication mode. Then, the communication controller 210 functions as the normal communicator 211 and causes the communicator 23 to start communication with the indoor units 30a and 30b using the first communication mode. The communicator 23 transmits and receives, via communication using the first communication mode, information necessary for control of the air-conditioning system 10, to and from the indoor units 30a and 30b.

In normal communication using the first communication mode and in normal communication using the second communication mode, content of information acquired from each indoor unit 30, content of information set for each indoor unit 30, a communication format for transmitting and receiving these kinds of information, and so on may be the same or may be different.

Second, the case in which communication by the communicator 23 is reset due to the second cause, that is, the temporary drop in the power supply voltage (WDR), is described.

In the case in which communication by the communicator 23 with the indoor unit 30 using the first communication mode is reset due to the second cause, the communication controller 210 causes the communicator 23 to resume communication with the indoor unit 30 using the first communication mode. Also, in the case in which communication by the communicator 23 with the indoor unit 30 using the second communication mode is reset due to the second cause, the communication controller 210 causes the communicator 23 to resume communication with the indoor unit 30 using the second communication mode. In other words, in a case in which communication by the communicator 23 with the indoor unit 30 using the first communication mode or the second communication mode is reset due to the second cause, the communication controller 210 causes the communicator 23 to resume communication with the indoor unit 30 using, from among the first communication mode and the second communication mode, the communication mode in use at the time communication by the communicator 23 is reset, without executing the previously-described determination processing by the previously-described system configuration determiner 212 and the communication mode determiner 213.

The reason for omitting such kinds of determination processing is because in a case in which the reset is due to a temporary drop in the power supply voltage, there is a high probability that the system configuration and the communication mode of the communication counterpart will not change before the reset is cleared. Therefore, in a case in which the reset due to the second cause occurs, the communication controller 210 refers to the communication mode storage 280 and the system configuration storage 290 and identifies the system configuration and communication mode at the timing of reset, without performing negotiation for confirming the system configuration, the communication mode, and the like at the time of restart after reset. Then, the communication controller 210 functions as the normal communicator 211 and causes the communicator 23 to start communication with the indoor units 30a and 30b using the same communication mode as that used just before the reset occurred. The communicator 23 transmits and receives, via communication using the same communication modes as that used just before the reset occurred, the information necessary for control of the air-conditioning system 10, to and from the indoor units 30a and 30b.

Next, functions of the indoor units 30a and 30b are described. FIG. 7 illustrated a functional configuration of the indoor units 30a and 30b. As illustrated in FIG. 7, the indoor units 30a and 30b each include a communication controller 310, a power supply voltage measurer 360, and a reset cause determiner 370. Each of these functions is achieved by software, firmware, or combination of software and firmware. The software and the firmware are recorded as programs and are stored in the ROM or the storage 32. The controller 31 achieves the functions of each of the components by the CPU executing the programs stored in the ROM or the storage 32.

The communication controller 310 controls the communicator 33 and causes the communicator 33 to communicate with the outdoor unit 20 which is the communication counterpart. As illustrated in FIG. 7, the communication controller 310 includes a normal communicator 311 and a communication mode determiner 313. The function of the communication controller 310 is achieved by the controller 31 in cooperation with the communicator 33. The communication controller 210 of the outdoor unit 20 is referred to as the first communication controller whereas the communication controller 310 of the indoor unit 30 is referred to as the second communication controller.

The normal communicator 311 causes the communicator 33 to execute normal communication with the outdoor unit 20 using the first communication mode or the second communication mode. More specifically, the communicator 33, under the control of the normal communicator 311, transmits and receives information that is necessary for control of the air-conditioning system 10 such as the previously-described status information, settings information, sensor measurement values, and the like, to and from the outdoor unit 20.

Also, as illustrated in FIG. 7, the indoor unit 30 includes a communication mode storage 380 and a system configuration storage 390. Both the communication mode storage 380 and the system configuration storage 390 are constructed in the storage region within the storage 32.

The communication mode storage 380 stores the communication mode in use at time the communication of the communicator 33 is reset. In other words, the communication mode storage 380 stores information that indicating whether the set communication mode of the communicator 33 was the first communication mode or the second communication mode, at the time the communication of the communicator 33 was reset. The function of the communication mode storage 380 is similar to the function of the communication mode storage 280 in the outdoor unit 20. The communication mode storage 280 of the outdoor unit 20 is referred to as the first communication mode storage whereas the communication mode storage 380 of the indoor unit 30 is referred to as the second communication mode storage.

When the communication of the communicator 33 is reset, the system configuration storage 390 stores the system configuration of the outdoor unit 20 which is the communication counterpart. The function of the system configuration storage 390 is similar to the function of the system configuration storage 290 in the outdoor unit 20. The system configuration storage 290 of the outdoor unit 20 is referred to as the first system configuration storage whereas the system configuration storage 390 of the indoor unit is 30 referred to as the second system configuration storage.

The power supply voltage measurer 360 measures the power supply voltage of the indoor unit 30. The power supply voltage of the indoor unit 30 is the voltage of power supplied to the main power supply of the indoor unit 30. The function of the power supply voltage measurer 360 is similar to the function of the power supply voltage measurer 260 of the outdoor unit 20. More specifically, the power supply voltage measurer 360 measures the power supply voltage of the indoor unit 30 by the capacitor, the A/D conversion circuit that performs A/D conversion of voltage applied to the capacitor, and so on that are connected between the power supply line and the ground. The function of the power supply voltage measurer 360 is achieved by the controller 31 in cooperation with the capacitor, the A/D conversion circuit, and the like.

The reset cause determiner 370 acquires the measurement value of the power supply voltage by the power supply voltage measurer 360 and, in a case in which communication by the communicator 33 is reset, determines the cause of the reset based on the measurement value of the power supply voltage. The function of the reset cause determiner 370 is achieved by the controller 31 in cooperation with the storage 32, the communicator 33, and the like. The function of the reset cause determiner 370 is similar to the function of the reset cause determiner 270 of the outdoor unit 20. The reset cause determiner 270 of the outdoor unit 20 is referred to as the first reset cause determiner whereas the reset cause determiner 370 of the indoor unit 30 is referred to as the second reset cause determiner.

The reset cause determiner 370 determines, based on the power supply voltage of the indoor unit 30, whether the communication by the communicator 33 is reset due to the first cause (main power supply off) or reset due to the second cause (temporary drop in power supply voltage). More specifically, in a case in the power supply voltage is below a specified value when communication by the communicator 33 is reset, the reset cause determiner 370 determines that communication by the communicator 33 is reset due to the first cause. In contrast to this, in a case in which the power supply voltage is greater than or equal to the specified value when communication by the communicator 33 is reset, the reset cause determiner 370 determines that communication by the communicator 33 is reset due to the second cause. This specified value is pre-set and stored in the ROM, the storage 32, or the like.

After communication by the communicator 33 is reset, the communication controller 310 determines the communication mode of the communicator 33 for restart in accordance with the cause of reset determined by the reset cause determiner 370 and the communication mode stored in the communication mode storage 380. Then, the communication controller 310 causes the communicator 33 to communicate with the outdoor unit 20 using the determined communication mode.

First, the case in which communication by the communicator 33 is reset due to the first cause, that is, the temporary drop in the power supply voltage (POR) is described. In a case in which communication with the outdoor unit 20 by the communicator 33 using the second communication mode is reset due to the first cause, if communication with the outdoor unit 20 using the second communication mode is acceptable, the communication controller 310 causes the communicator 33 to resume communication with the outdoor unit 20 using the second communication mode. Conversely, in the same case, if communication with the outdoor unit 20 using the second communication mode is unacceptable, the communication controller 310 causes the communicator 33 to start communication with the outdoor unit 20 using the first communication mode.

Here, the expression "communication with the outdoor unit 20 using the second communication mode is acceptable" means that the outdoor unit 20 supports the second communication mode and that communication between the indoor unit 30 and the outdoor unit 20 can be established using the second communication mode. In a case in which communication of the communicator 33 with the outdoor unit 20 using the second communication mode is reset due to the first cause, the communication controller 310 executes determination processing that is to determine whether or not communication with the outdoor unit 20 using the second communication mode is acceptable. Then, the communication controller 310 uses, from among the first communication mode and the second communication mode, a communication mode determined in accordance with this determination processing to cause the communicator 33 to start communication with the outdoor unit 20. As a function for executing this kind of determination processing, the communication controller 310 includes the communication mode determiner 313 that determines the communication mode of the outdoor unit 20.

In a case in which communication with the outdoor unit 20 by the communicator 33 using the second communication mode is reset by the first cause, the communication mode determiner 313 determines whether or not information indicating that communication is acceptable using the second communication mode is received from the outdoor unit 20 via communication by the communicator 33 using the second communication mode. The expression "information indicating that communication is acceptable using the second communication mode" is in reference to information indicating that the system configuration is finalized using the second communication mode or is information that is transmitted by normal communication using the second communication mode.

For example, in a case in which the indoor unit 30 and the outdoor unit 20 are reset due to the first cause, the outdoor unit 20 uses the system configuration determiner 212 to confirm the system configuration of the indoor unit 30. In a case in which an inquiry of the system configuration is received from the outdoor unit 20, the communication controller 310 of the indoor unit 30 replies to the outdoor unit 20 with a response indicating that communication is acceptable using the second communication mode. After successfully determining the system configuration of all of the indoor units 30 using the second communication mode, the outdoor unit 20 transmits information indicating that the system configuration is finalized to the indoor units 30 using the second communication mode. Conversely, if only the indoor unit 30 is reset due to the first cause and the outdoor unit 20 is not reset, the outdoor unit 20 uses the normal communicator 211 to transmit information necessary for control of the air-conditioning system 10 to the indoor unit 30 using the second communication mode.

After the reset is cleared, the communication mode determiner 313 awaits communication from the outdoor unit 20 via communication by the communicator 33 using the second communication mode. Then, the communication mode determiner 313 determines whether or not information indicating that communication is acceptable using the second communication mode is received before elapsing of the pre-set time duration after the reset is cleared. This pre-set time duration is, for example, 30 seconds, 60 seconds, or the like, and this pre-set time duration is stored in advance in the storage 32. As a result of the determination by the communication mode determiner 313, the communication controller 310 determines that communication with the outdoor unit 20 using the second communication mode is acceptable in a case in which information indicating that communication is acceptable using the second communication mode is received from the outdoor unit 20 before elapsing of the pre-set time duration after the reset is cleared.

In a case in which a determination is made that communication with the outdoor unit 20 using the second communication mode is acceptable, the communication controller 310 establishes communication with the outdoor unit 20 using the second communication mode. Then, the communication controller 310 functions as the normal communicator 311 and causes the communicator 33 to resume communication with the outdoor unit 20 using the second communication mode. The communicator 33 transmits to and receives from the outdoor unit 20 the information necessary for control of the air-conditioning system 10 via communication using the second communication mode.

In contrast to this, in a case in which a determination is made that communication with the outdoor unit 20 using the second communication mode is unacceptable, the communication controller 310 establishes communication with the outdoor unit 20 using the first communication mode. Also in a case in which communication by the communicator 33 with the outdoor unit 20 using the first communication mode is reset due the first cause, the communication controller 310 causes the communicator 33 to resume communication with the outdoor unit 20 using the first communication mode. The communication controller 310 functions as the normal communicator 311 and causes the communicator 33 to start communication with the outdoor unit 20 using the first communication mode. The communicator 33 transmits to and receives from the outdoor unit 20 the information necessary for control of the air-conditioning system 10 via communication using the first communication mode.

Second, a case in which communication by the communicator 33 is reset due to the second cause, that is, a temporary drop in the power supply voltage (WDR), is described. In the case of a reset due to a temporary drop in the power supply voltage, there is high probability that the system configuration and the communication mode of the communication counterpart will not change before the reset is cleared. Therefore, the communicator 33 transmits and receives the information necessary for control of the air-conditioning system 10 to and from the outdoor unit 20 via communication using the same communication mode as that used just before the reset occurred.

More specifically, in the case in which communication by the communicator 33 with the outdoor unit 20 using the first communication mode is reset due to the second cause, the communication controller 310 causes the communicator 33 to resume communication with the outdoor unit 20 using the first communication mode. Also, in the case in which communication by the communicator 33 with the outdoor unit 20 using the second communication mode is reset due to the second cause, the communication controller 310 causes the communicator 33 to resume communication with the outdoor unit 20 using the second communication mode. In other words, in a case in which communication by the communicator 33 with the outdoor unit 20 using the first communication mode or the second communication mode is reset due to the second cause, the communication controller 310 causes the communicator 33 to resume communication with the outdoor unit 20 using, from among the first communication mode and the second communication mode, the communication mode in use at the time communication by the communicator 33 is reset, without executing the previously-described determination processing by the previously-described communication mode determiner 313.

A flow of the processing executed in the outdoor unit 20 and the indoor unit 30 that function as described above is described below with reference to the flowcharts illustrated in FIGS. 8 and 9.

Figure 8:
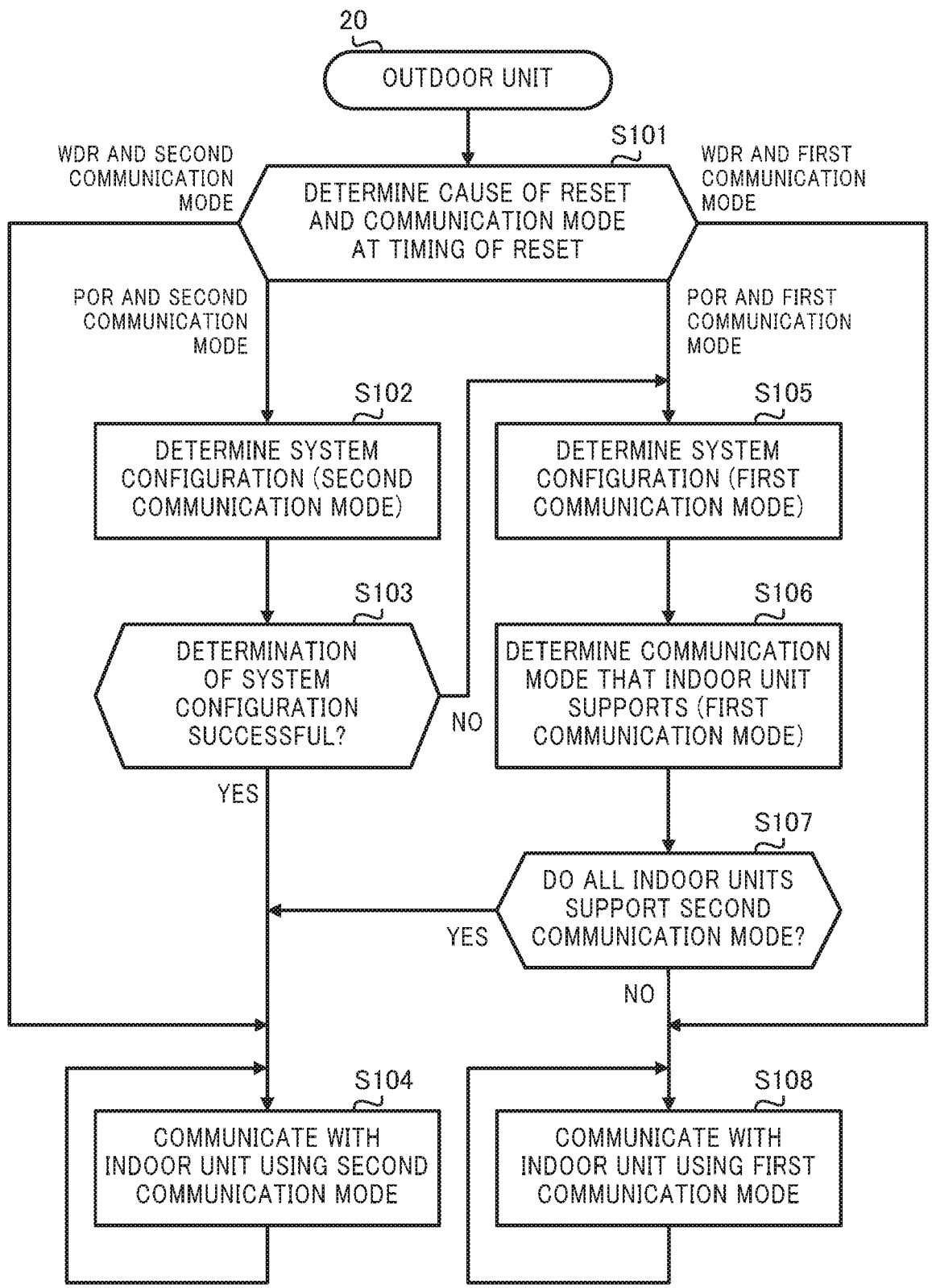
FIG. 8 is a flowchart illustrating a flow of communication processing executed by the outdoor unit with the indoor unit in Embodiment 1.
Figure 9:
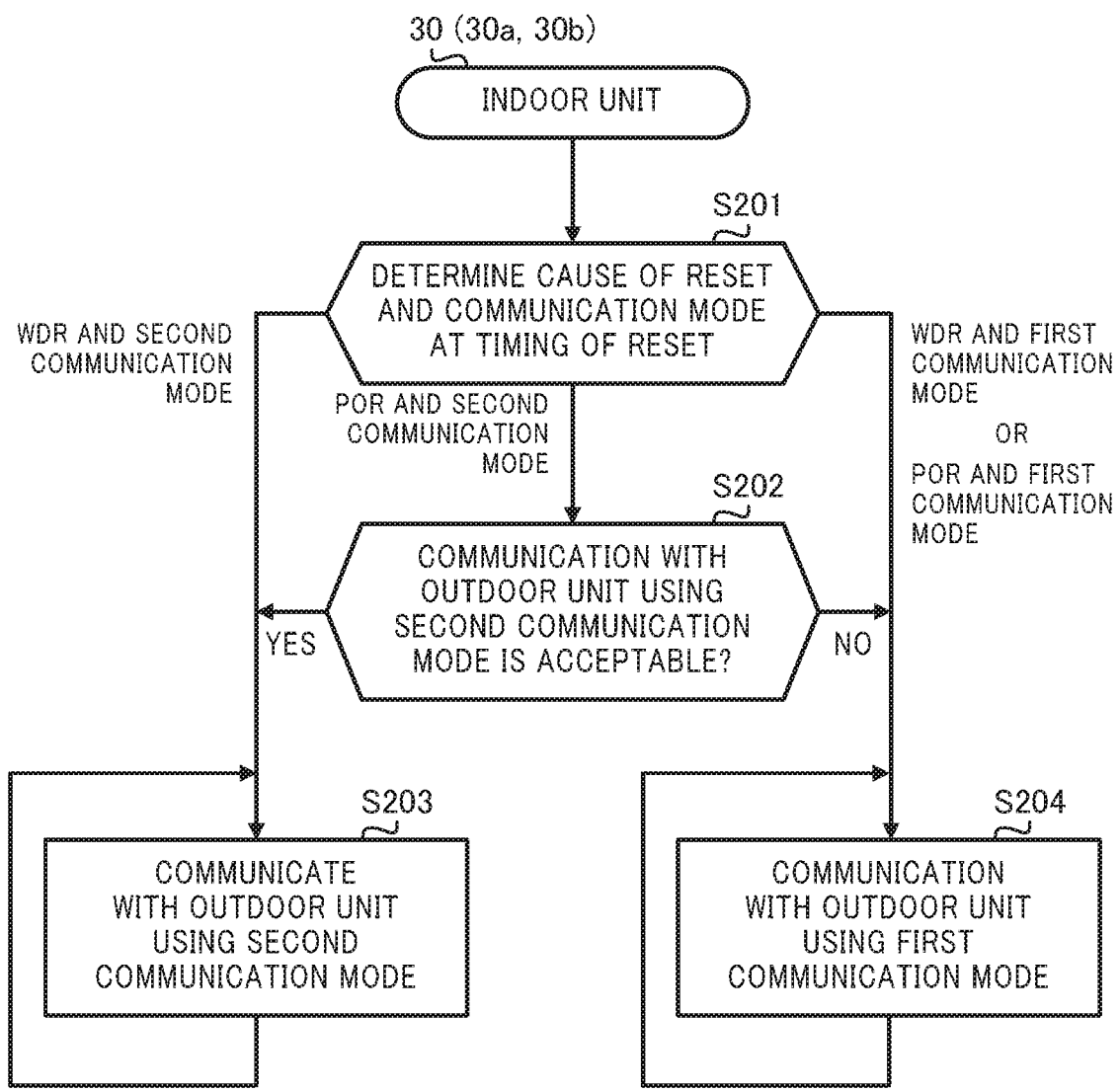
FIG. 9 is a flowchart illustrating a flow of communication processing executed by the indoor unit with the outdoor unit in Embodiment 1.

The flowchart illustrated in FIG. 8 illustrates the flow of communication processing executed by the outdoor unit 20 with each of the indoor units 30a and 30b. The flowchart illustrated in FIG. 8 illustrates a communication processing flow beginning with the outdoor unit 20, having been reset, in a restarted state after clearing of the reset.

After the outdoor unit 20 restarts, the controller 21 of the outdoor unit 20 determines the cause of the reset and the communication mode at the timing of reset (step S101).

More specifically, the controller 21 functions as the power supply voltage measurer 260 and the reset cause determiner 270 and if the power supply voltage at the time of start-up (start-up time) is below the specified value, the controller 21 determines that the first cause, that is, the main power supply off (POR), is the cause of the reset, whereas if the power supply voltage is greater than or equal to the specified value, the controller 21 determines that the second cause, that is, the main power supply off (WDR), is the cause of the reset. Also, the controller 21 refers to the communication mode storage 280 and determines whether the communication mode at the timing of reset was the first communication mode or the second communication mode. By default (time of shipping from factory), the cause of the reset is set to the main power supply off (POR) and the communication mode at the timing of reset is set to the first communication mode.

As a result of the determination in step S101, if a determination is made that the cause of the reset is the first cause (main power supply off) and the communication mode at the timing of reset is the second communication mode (POR and second communication mode in step S101), the controller 21 determines the system configuration of the indoor unit 30 via communication by the communicator 23 using the second communication mode (step S102). Then, the controller 21 determines whether or not the system configuration using the second communication mode is successfully determined (step S103).

More specifically, in order to communicate with the indoor unit 30 using the second communication mode, which is the same communication mode used just before the reset occurred, controller 21 confirms the quantity of units, the communication addresses, and the like of the indoor unit 30 via communication using the second communication mode, and attempts to reestablish communication with the indoor unit 30 using the second communication mode. In a case in which all of the indoor units 30 which are the communication counterparts support the second communication mode and confirmation that the communication addresses all of the indoor units 30 are properly set could be performed, the controller 21 determines that the system configuration using the second communication mode is successfully determined. In steps S102 and S103, the controller 21 functions as the system configuration determiner 212.

In the case in which the system configuration using the second communication mode is successfully determined (YES in step S103), the controller 21 transitions to normal communication using the second communication mode and communicates with the indoor unit 30 using the second communication mode (step S104). In other words, the controller 21 reestablishes communication with the indoor unit 30 using the second communication mode, which is the same communication mode used just before the reset occurred, and resumes normal communication with the indoor unit 30 using the second communication mode.

More specifically, the controller 21 transmits and receives, via communication by the communicator 23 using the second communication mode, information that is necessary for control of the air-conditioning system 10 such as the previously-described status information, settings information, sensor measurement values, and the like, to and from the indoor units 30a and 30b. In the case in which determination of the system configuration using the second communication mode is successfully performed, the controller 21 notifies the indoor unit 30 that the system configuration using the second communication mode was finalized by transmitting the specified frame. In step S104, the controller 21 functions as the normal communicator 211.

In contrast to this, when unsuccessful at determining the system configuration using the second communication mode (NO in step S103), the controller 21 determines the system configuration of the indoor unit 30 via communication by the communicator 23 using the first communication mode (step S105). In other words, the controller 21 determines the system configuration of the indoor unit 30 using the first communication mode which is the conventional communication mode. When doing so, the controller 21 transmits, via communication by the communicator 23 using the second communication mode, a request to switch the communication mode of all of the indoor units 30, also including the indoor unit 30 for which communication using the second communication mode is acceptable, to the first communication mode in order to communicate with all of the indoor units 30 using the first communication mode.

More specifically, the controller 21 confirms the quantity of units, communication addresses, and the like of the indoor unit 30 via communication using the first communication mode and the establishes communication with the indoor unit 30 using the first communication mode in order to communicate with the indoor unit 30 using the first communication mode which is the same communication mode used just before the reset occurred. The manner of determining the system configuration using the first communication mode in step S105 may be the same as the manner of determining the system configuration using the second communication mode in step S102 or the two may be different from each other. In step S105, the controller 21 functions as the system configuration determiner 212.

Also, as a result of the result determination in step S101, if a determination is made that the cause of the reset is the first cause (main power supply off) and the communication mode at the timing of reset is the first communication mode (POR and first communication mode in step S101), processing advances to step S105, and the controller 21 determines the system configuration of the indoor unit 30 via communication by the communicator 23 using the first communication mode.

After determining the system configuration using the first communication mode, the controller 21 determines the communication mode that the indoor unit 30 supports via communication by the communicator 23 using the first communication mode (step S106). More specifically, the controller 21 individually confirms the communication mode that the respective indoor units 30a and 30b support by communicating with each of the indoor units 30a and 30b using the first communication mode. Then, in a case in which the communication mode determiner 213 receives a response from the indoor unit 30 indicating that the indoor unit 30 supports the second communication mode, the communication mode determiner 213 determines that the indoor unit 30 supports the second communication mode. In step S106, the controller 21 functions as the communication mode determiner 213.

As a result of the determination of the communication mode, the controller 21 determines whether or not all of the indoor units 30 support the second communication mode (step S107). If a determination is made that all of the indoor units 30 support the second communication mode (YES in step S107), processing transitions to step S104 and the controller 21 communicates with the indoor unit 30 using the second communication mode. In other words, the controller 21 establishes communication with the indoor unit 30 using the second communication mode, and starts normal communication with the indoor unit 30 using the second communication mode. When doing so, the controller 21 transmits, via communication by the communicator 23 using the first communication mode, a request to switch the communication mode of all of the indoor units 30 to the second communication mode in order to communicate with all of the indoor units 30 using the second communication mode.

In contrast to this, if a determination is made that at least one of the indoor units 30 does not support the second communication mode (NO in step S107), the controller 21 communicates with the indoor unit 30 using the first communication mode (step S108). In other words, the controller 21 establishes communication with the indoor unit 30 using the first communication mode and starts normal communication with the indoor unit 30 using the first communication mode. More specifically, the controller 21 transmits and receives, via communication by the communicator 23 using the first communication mode, information that is necessary for control of the air-conditioning system 10 such as the previously-described status information, settings information, sensor measurement values, and the like, to and from the indoor units 30a and 30b. In step S108, the controller 21 functions as the normal communicator 211.

In the above, a case is described the first cause (main power supply off) is determined as the cause of the reset in step S101. Conversely, as a result of determination in step S101, if a determination is made that the cause of the reset is the second cause (temporary drop in power supply voltage) and the communication mode at the timing of reset is the second communication mode (WDR and second communication mode in step S101), the controller 21 communicates with the indoor unit 30 using the second communication mode in step S104. In other words, the controller 21 establishes communication with the indoor unit 30 using the second communication mode and resumes normal communication with the indoor unit 30 using the second communication mode.

Similarly, as a result of the determination in step S101, if a determination is made that the cause of the reset is the second cause (temporary drop in power supply voltage) and the communication mode at the timing of reset is the first communication mode (WDR and first communication mode in step S101), the controller 21 communicates with the indoor unit 30 using the first communication mode in step S108. In other words, the controller 21 establishes communication with the indoor unit 30 using the first communication mode and resumes normal communication with the indoor unit 30 using the first communication mode.

In this manner, in a case in which reset occurs due to the second cause, the controller 21 omits the determination processing in steps S102 to S103 and steps S105 to S107, and resumes communication with the indoor unit 30 using the communication mode at the timing of reset. After normal communication using the second communication mode in step S104 or normal communication using the first communication mode in step S108 starts, the controller 21 continues the started normal communication until another reset occurs.

Next, processing of the indoor units 30a and 30b is described. The flowchart in FIG. 9 illustrates a flow in which processing of communication with the outdoor unit 20 is executed by each of the indoor units 30a and 30b. The flowchart illustrated in FIG. 9 illustrates a communication processing flow beginning with the indoor unit 30, having been reset, in a restarted state after clearing of the reset After the indoor unit 30 restarts, the controller 31 of the indoor unit 30 determines the cause of the reset and the communication mode at the timing of reset (step S201).

More specifically, the controller 31 functions as the power supply voltage measurer 360 and the reset cause determiner 370 and if the power supply voltage at the time of start-up is below the specified value, the controller 31 determines that the first cause, that is, the main power supply off (POR), is the cause of the reset, whereas if the power supply voltage is greater than or equal to the specified value, the controller 31 determines that the second cause, that is, the main power supply off (WDR), is the cause of the reset. Also, the controller 31 refers to the communication mode storage 380 and determines whether the communication mode at the timing of reset was the first communication mode or the second communication mode. By default (time of shipping from factory), the cause of the reset is set to the main power supply off (POR) and the communication mode at the timing of reset is set to the first communication mode.

As a result of the determination step in S201, if a determination is made that the cause of the reset is the first cause (main power supply off) and the communication mode at the timing of reset is the second communication mode (POR and second communication mode in step S201), the controller 31 determines whether or not the communication with the outdoor unit 20 using the second communication mode is acceptable (step S202).

More specifically, the controller 31 determines that communication with the outdoor unit 20 using the second communication mode is acceptable in a case in which information that communication is acceptable using the second communication mode is received from the outdoor unit 20 before elapsing of the pre-set time duration after the reset is cleared. The information indicating that communication is acceptable using the second communication mode, as previously described, is information indicating that the system configuration is finalized using the second communication mode or is information that is transmitted by normal communication using the second communication mode. In step S202, the controller 31 functions as the communication mode determiner 313.

As a result of the determination, if a determination is made that communication with the outdoor unit 20 using the second communication mode is acceptable (YES in step S202), the controller 31 transitions to normal communication using the second communication mode and communicates with the outdoor unit 20 using the second communication mode (step S203). In other words, the controller 31 establishes communication with the outdoor unit 20 using the second communication, which is the same communication mode used just before the reset occurred, and resumes normal communication with the outdoor unit 20 using the second communication mode.

In contrast to this, if a determination is made that communication with the outdoor unit 20 using the second communication mode is unacceptable (NO in step S202), the controller 31 transitions to normal communication using the first communication mode and communications with the outdoor unit 20 using the first communication mode (step S204). In other words, the controller 21 establishes communication with the outdoor unit 20 using the first communication mode and starts normal communication with the outdoor unit 20 using the first communication mode.

As a result of the determination in step S201, if a determination is made that the cause of the reset is the first cause (main power supply off) and the communication mode at the timing of reset is the first communication mode (POR and first communication mode in step S201), the controller 31 communicates with the outdoor unit 20 using the first communication mode in step S204. In other words, the controller 31 establishes communication with the outdoor unit 20 using the first communication mode and resumes normal communication with the outdoor unit 20 using the first communication mode.

Also, as a result of the determination in step S201, if a determination is made that the cause of the reset is the second cause (temporary drop in power supply voltage) and the communication mode at the timing of reset is the first communication mode (WDR and first communication mode in step S201), the controller 31 communicates with the outdoor unit 20 using the first communication mode in step S204. In other words, after the communication using the first communication mode is reset, the controller 31 omits the determination processing in step S202, regardless of whether the cause of the reset is the first cause or the second cause, and resumes normal communication with the outdoor unit 20 using the first communication mode which is the same communication mode used just before the reset occurred. When doing so, in a case in which an inquiry of the communication mode that is supported by the outdoor unit 20 is received from the outdoor unit 20, the communication controller 310 replies, as a response to the inquiry, with information indicating that the second communication mode is supported.

Conversely, as a result of the determination in step S201, if a determination is made that the cause of the reset is the second cause (temporary drop in power supply voltage) and the communication mode at the timing of reset is the second communication mode (WDR and second communication mode in step S201), the controller 31, in step S203, communicates with the outdoor unit 20 using the second communication mode. In other words, the controller 31 omits the determination processing in step S202 and resumes normal communication with the outdoor unit 20 using the second communication mode which is the same communication mode used just before the reset occurred.

After normal communication using the second communication mode in step S203 or normal communication using the first communication mode in step S204 starts, the controller 31 continues the started normal communication until another reset occurs. If the controller 31 receives a request from the outdoor unit 20 to change the communication mode to the second communication mode while communication is underway with the outdoor unit 20 using the first communication mode, the controller 31 switches the communication mode in use in accordance with the received request to the second communication mode and communicates with the outdoor unit 20. Similarly, if the controller 31 receives a request from the outdoor unit 20 to change the communication mode to the first communication mode while communication is underway with the outdoor unit 20 using the second communication mode, the controller 31 switches the communication mode in use in accordance with the received request to the first communication mode and communicates with the outdoor unit 20.

As described above, in the air-conditioning system 10 according to Embodiment 1, in a case in which communication with the indoor unit 30 is reset due to the main power supply being off, if communication with the indoor unit 30 using the second communication mode is acceptable, the outdoor unit 20 resumes communication with the indoor unit 30 using the second communication mode, whereas if communication with the indoor unit 30 using the second communication mode is unacceptable, the outdoor unit 20 starts communication with the indoor unit 30 using the first communication mode. In contrast to this, in a case in which communication with the indoor unit 30 is reset due to a temporary drop in the power supply voltage, the outdoor unit 20 resumes communication with the indoor unit 30 using the communication mode in use when communication is reset, without executing the processing that is to determine whether or not communication with the indoor unit 30 can using the second communication mode is acceptable.

If the cause of the reset is the temporary drop in the power supply voltage, there is high probability that the system configuration will not change. Therefore, the outdoor unit 20 returns to the state prior to the reset, without performing negotiation for confirming the system configuration, communication mode, and the like at the time of restart. In doing so, communication with the indoor unit 30 can be resumed quickly. Conversely, if the cause of the reset is the main power supply off, then the system configuration is assumed to change. Therefore, the outdoor unit 20 determines the system configuration and the communication mode of the indoor unit 30 and starts communication with the indoor unit 30 using the communication mode that is acceptable. In doing so, changes in the system configuration can be handled appropriately.

Also, in the air-conditioning system 10 according to Embodiment 1, the indoor unit 30, similarly to the outdoor unit 20, determines the communication mode for restart in accordance with the cause of reset determined by the reset cause determiner 370 and the communication mode stored in the communication mode storage 380. In doing so, a unit can be restored to the previous state appropriately and quickly regardless of whether the reset occurred in the outdoor unit 20 or the indoor unit 30.

In particular, in an air-conditioning system 10 that is a dispersed array type in which indoor units 30 are connected to a single outdoor unit 20, often is the case where devices using a conventional communication mode and devices using a new communication mode are mixedly used as a result of only a some of the devices among the outdoor unit 20 and the indoor units 30 being replaced. In a case in which a reset occurs as in the communication system where multiple communication modes are mixedly used, the air-conditioning system 10 according to Embodiment 1 can appropriately and quickly determine the communication mode for restart and resume communication with the communication counterpart.

Embodiment 2

Next, Embodiment 2 of the present disclosure is described.

In Embodiment 1, in the case in which communication with the indoor unit 30 using the second communication mode is reset due to the first cause, the system configuration determiner 212 of the outdoor unit 20 determines the system configuration of the indoor unit 30 via communication using the second communication mode. In contrast to this, in an air-conditioning system 10 according to Embodiment 2, the system configuration determiner 212 of the outdoor unit 20 determines the system configuration of the indoor unit 30 using only the first communication mode. That is, the system configuration determiner 212 does not determine the system configuration using the second communication mode.

Figure 10:
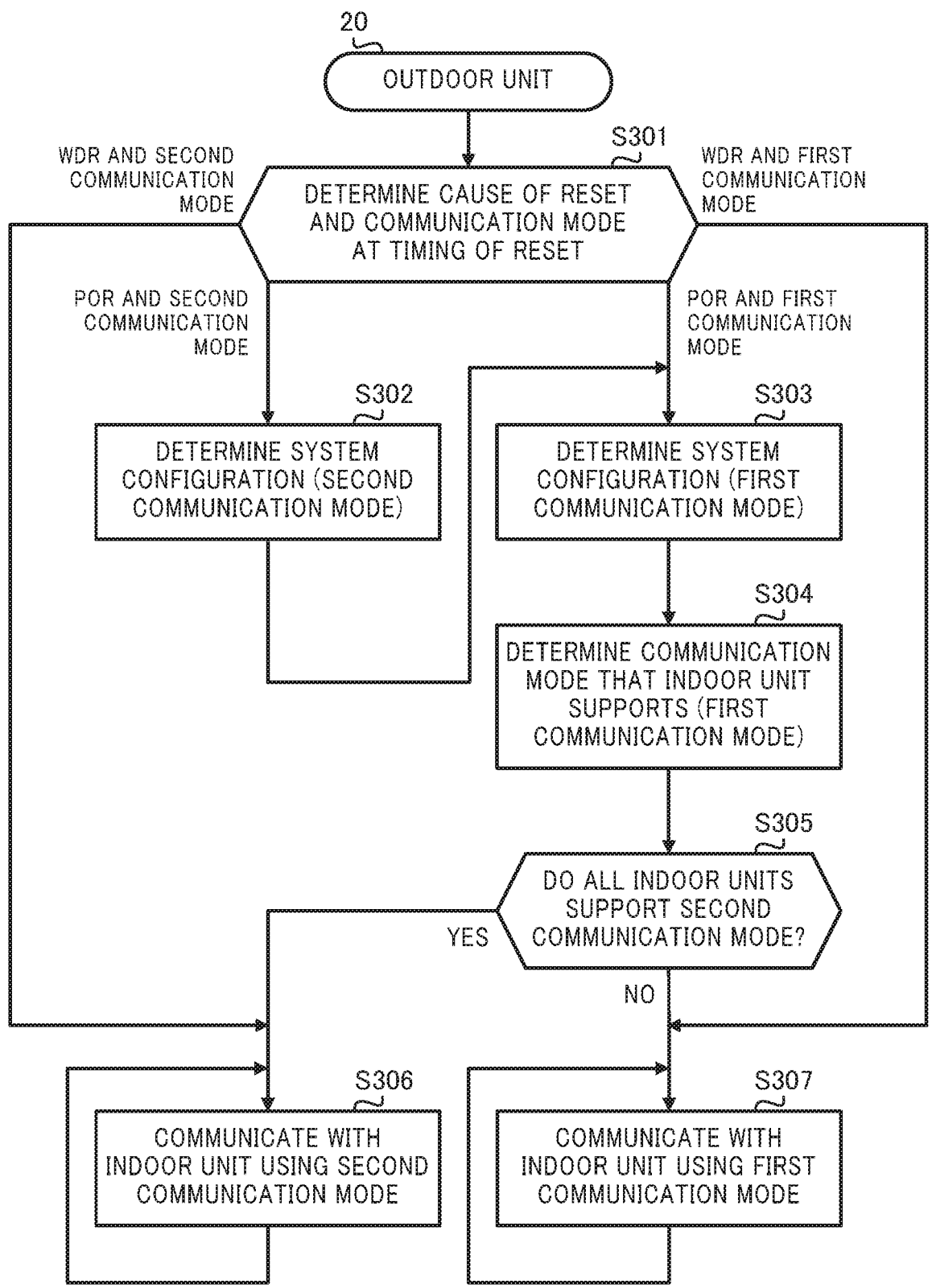
FIG. 10 is a flowchart illustrating a flow of communication processing executed by an outdoor unit with an indoor unit in Embodiment 2.

FIG. 10 illustrates a flow of processing that is executed in the outdoor unit 20 in Embodiment 2. The flowchart illustrated in FIG. 10 illustrates a communication processing flow beginning with the outdoor unit 20, having been reset, in a restarted state after clearing of the reset. The flow of processing executed in the indoor unit 30 is omitted since the flow is similar to that described in reference to FIG. 9 in Embodiment 1.

After the outdoor unit 20 restarts, the controller 21 of the outdoor unit 20 determines the cause of the reset and the communication mode at the timing of reset (step S301). The processing in step S301 is the same as the processing in step S101 illustrated in FIG. 8 in Embodiment 1.

As a result of the determination in step S301, if a determination is made that the cause of the reset is the first cause (main power supply off) and the communication mode at the timing of reset is the second communication mode (POR and second communication mode in step S301), the controller 21 transmits to the indoor unit 30 a request for switching the communication mode to the first communication mode, via communication by the communicator 23 using the second communication mode (step S302). In other words, the controller 21 transmits, via communication by the communicator 23 using the second communication mode, a request to switch the communication mode of all of the indoor units 30, also including the indoor unit 30 for which communication using the second communication mode is acceptable, to the first communication mode in order to communicate with all of the indoor units 30 using the first communication mode.

After transmission of the request to switch the communication mode, the controller 21 determines the system configuration of the indoor unit 30 via communication by the communicator 23 using the first communication mode (step S303). More specifically, the controller 21 confirms the quantity of units, communication addresses, and the like of the indoor unit 30 via communication using the first communication mode, and establishes communication with the indoor unit 30 using the first communication mode in order to communicate with the indoor unit 30 using the first communication mode which is the same communication mode used just before the reset occurred. In steps S302 and S303, the controller 21 functions as the system configuration determiner 212.

The subsequent processing from steps S304 to S307 is the same as the processing of steps S104 and S106 to S108 that are illustrated in FIG. 8 in Embodiment 1. More specifically, after determining the system configuration using the first communication mode, the controller 21 determines the communication mode that is supported by the indoor unit 30 via communication by the communicator 23 using the first communication mode. If a determination is made that all of the indoor units 30 support the second communication mode, the controller 21 determines that communication with the indoor units 30 using the second communication mode is acceptable. Since these types of processing are similar to that of the processing described in Embodiment 1, the description of these types of processing are omitted here.

As described above, even if the outdoor unit 20 in Embodiment 2 cannot confirm the system configuration of the indoor unit 30 using the second communication mode, since confirmation of the system configuration of the indoor unit 30 is performed using the first communication mode, the indoor unit 20 can select the appropriate communication mode to establish communication with the indoor unit 30. In particular, in a case in which the outdoor unit 20 is reset due to the first cause (main power supply oft), the outdoor unit 20 cannot distinguish whether the indoor unit 30 (i) is continuing normal operation, (ii) was reset due to the first cause, or (iii) was reset due to the second cause. In such conditions, the outdoor unit 20 can accurately distinguish the system configuration of the indoor unit 30 by uniformly switching the communication mode of all of the indoor units 30 to the first communication mode.

In Embodiment 2, in a case in which the cause of the reset is the first cause (main power supply oft), the system configuration determiner 212 may determine the system configuration of the indoor unit 30 using the first communication mode after transmitting to the indoor unit 30 a request to switch the communication mode to the first communication mode regardless of whether the communication mode stored in the communication mode storage 280 at the timing of reset is the first communication mode or the second communication mode. In doing so, the software can be simplified. Also, in a case in which the system configuration determiner 212 attempts to determine the system configuration of the indoor unit 30 using the first communication mode yet is unsuccessful at determining the system configuration before elapsing of the pre-set time duration after the reset is cleared, the system configuration determiner 212 may subsequently transmit to the indoor unit 30 a request, using the second communication mode, to switch the communication mode to the first communication mode.

Modified Embodiment

Although embodiments of the present disclosure are described above, modifications and applications based on various aspects can be used in implementing the present disclosure.

For example, in the above embodiments, the communication system according to the present disclosure is described using an example in which the air-conditioning system 10 that includes a single outdoor unit 20 and two indoor units 30a and 30b. However, the communication system according to the present disclosure is not limited to an air-conditioning system. The communication system according to the present disclosure may be a communication system that communicates using a wire or wirelessly between house appliances other than an air-conditioning system and normal information devices such as a personal computer, smartphone, and the like.

Also, even in the case in which the air-conditioning system 10 functions as a communication system, the indoor unit 30 may function as a communication device and the outdoor unit 20 may function as a device of a communication counterpart, which is opposite to that described in the above embodiments.

In the above embodiments, there are two indoor units 30a and 30b that function as devices of the communication counterpart of the communication device. However, in the present disclosure, the quantity of devices of the communication counterpart of the communication device is not limited to two units. The configuration of the air-conditioning system 10 described in the above embodiments is applicable to a communication system in which a communication device communicates with at least one communication counterpart. In a case in which there is a single communication counterpart, the communication device executes the above described processing with this single counterpart. However, the greater the quantity of communication counterparts with which the communication devices communicates, the greater the probability a reset occurs in one of the devices, and hence, the greater the effect of the present disclosure.

In the above embodiments, the outdoor unit 20 and the indoor units 30a and 30b can communicate using two communication modes, namely the low speed first communication mode and the high-speed second communication mode. However, the first communication mode and the second communication mode do not necessarily have different communication speeds. The first communication mode and the second communication mode may have different communication procedures or different communication formats for example. Also, in the communication system according to the present disclosure, the communication device and the communication counterpart of the communication device may communicate using three or more communication modes, and may be configured to switch to a communication mode among the three or more communication modes. As such, the present disclosure can be applied to any communication system and communication device as long as communication using different communication modes is acceptable.

In the above embodiments, the reset cause determiner 270 determines the cause of the reset by determining whether the power supply voltage is equal to or greater than a specified value at the time when communication by the communicator 23 is reset. However, the reset cause determiner 270 may determine the cause of the reset by another method.

For example, the reset cause determiner 270 may determine that communication by the communicator 23 is reset due to the first cause in a case in which power supply voltage reaches or exceeds a specified value before elapsing of a specified time duration after the power supply voltage decreases below the specified value and may determine that communication by the communicator 23 is reset due to the second cause in a case in which the power supply voltage does not reach or exceed the specified value before elapsing of the specified time duration after the power supply voltage decreases below the specified value. More specifically, the reset cause determiner 270 monitors, since before the reset occurs, whether or not a value of the power supply voltage measured by the power supply voltage measurer 260 falls below the specified value. As a result of the monitoring, in a case in which the power supply voltage drops below the specified value and subsequently does not return to or exceed the specified value before the specified time duration elapses, the reset cause determiner 270 determines that the reset occurred due to the first cause (main power supply off). Conversely, in a case in which the power supply voltage falls below the specified value and subsequently returns to or exceeds the specified value before the specified time duration elapses, the reset cause determiner 270 determines that the reset occurred due to the second cause (temporary drop in power supply voltage). This specified value and this specified time duration are pre-set and stored in the ROM, the storage 22, or the like.

In this manner, in the case in which the cause of the reset is determined by determining whether or not the drop in the power supply voltage continued longer than or equal to the specified time duration, the reset cause determiner 270, the reset cause determiner 270 saves information indicating the determination result into the storage 22 when the specified time duration since the drop in power supply voltage elapses. For example, in the case in which a determination is made that the cause of the reset is the first cause, the reset cause determiner 270 is configured to set a flag indicating that the main power supply is off so that the reset cause determiner 270 can refer to a determination result of the cause of the reset after the reset is cleared. In addition to the reset cause determiner 270 of the communication device, the reset cause determiner 370 of the communication counterpart similarly can determine the cause of thee reset by using such a method.

Of the causes that are described in the above embodiments, the first cause is main power supply off (POR) and the second cause is temporary drop in power supply voltage (WDR). However, in the present disclosure, the causes of reset are not limited to these examples as long as the second cause is a cause that is different from the first cause and there is a higher probability than with the first cause that the system configuration of the communication counterpart at the timing of reset does not change.

Also, the device that functions as the communication counterpart of the communication device may be equipped without the communication controller 310 and the reset cause determiner 370. In the case in which the device is not equipped with the communication controller 310 and the reset cause determiner 370, in the event that the device is reset, the cause of the reset is not determined. Therefore, the device functioning as the communication counterpart switches the communication mode in accordance with a request from the communication device without switching the communication mode in accordance with the cause of the reset.

In the above embodiments, in the controller 21 of the outdoor unit 20, the CPU executes the program stored in the ROM or the storage 22, thereby functioning as the communication controller 210, the power supply voltage measurer 260, and the reset cause determiner 270. Also, in the controller 31 of the indoor units 30a and 30b, the CPU executes the program stored in the ROM or the storage 32, thereby functioning as the communication controller 310, the power supply voltage measurer 360, and the reset cause determiner 370. However, in the present disclosure, the controllers 21 and 31 may be dedicated hardware. The term "dedicated hardware" means, for example, a single circuit, a composite circuit, a programmed processor, an application specific integrated circuit (ASIC), a field-programmable gate array (FPGA), combinations thereof, or the like. In the case in which the controllers 21 and 31 are dedicated hardware, the functions of each component may be achieved by separate respective hardware, or may be achieved collectively by a single hardware unit.

Further, among each of the functions, a portion may be achieved using dedicated hardware, and the other portion may be achieved by software or firmware. In this manner, the controllers 21 and 31 can achieve the aforementioned various functions by hardware, software, firmware, or a combination of such.

An operating program specifying the operations of the communication device and the communication counterpart according to the present disclosure can be used with a computer such as an existing personal computer, an information terminal device, or the like, thereby enabling the computer to function as the communication device and the communication counterpart according to the present disclosure.

Further, any method may be used for distribution of such a program, and for example, the program may be stored and distributed on a computer-readable recording medium such as a compact disc read-only memory (CD-ROM), a digital versatile disc (DVD), a magneto-optical (MO) disc, a memory card, or the like computer-readable recording medium, and the program may be distributed through a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be used with advantage for a communication device and the like that can perform communication with a communication counterpart using multiple communication modes.

The invention claimed is:

1. A communication device comprising:
    a communicator configured to communicate with a communication counterpart using a first communication mode or a second communication mode; and
    a communication controller,
    wherein
    when a communication by the communicator with the communication counterpart using the second communication mode is reset due to a first cause, and
        if the communication with the communication counterpart using the second communication mode is acceptable, the communication controller causes the communicator to resume the communication with the communication counterpart using the second communication mode,
        if the communication with the communication counterpart using the second communication mode is unacceptable, the communication controller causes the communicator to start a communication with the communication counterpart using the first communication mode,
    when the communication by the communicator with the communication counterpart using the second communication mode is reset due to a second cause, the communication controller causes the communicator to resume the communication with the communication counterpart using the second communication mode,
    the first cause is main power supply of the communication device switching to off,
    the second cause is a drop in power supply voltage of the communication device, and
    the communication controller determines that the communication with the communication counterpart using the second communication mode is acceptable
    when the communication controller successfully determines a system configuration of the communication counterpart via the communication using the second communication mode, or
    when the communication controller successfully determines the system configuration of the communication counterpart via a communication using the first communication mode and the communication counterpart supports the second communication mode.

2. The communication device according to claim 1, wherein
    when the communication by the communicator with the communication counterpart using the first communication mode is reset due to the first cause, and
        if the communication with the communication counterpart using the second communication mode is acceptable, the communication controller causes the communicator to start a communication with the communication counterpart using the second communication mode, and
        if the communication with the communication counterpart using the second communication mode is unacceptable, the communication controller causes the communicator to resume the communication with the communication counterpart using the first communication mode, and
    when the communication by the communicator with the communication counterpart using the first communication mode is reset due to the second cause, the communication controller causes the communicator to resume the communication with the communication counterpart using the first communication mode.

3. The communication device according to claim 1, wherein
    when the communication by the communicator with the communication counterpart is reset due to the first cause, the communication controller executes determination processing to determine whether or not the communication with the communication counterpart using the second communication mode is acceptable and causes the communicator to start a communication with the communication counterpart using, from among the first communication mode and the second communication mode, one communication mode determined in accordance with the determination processing, and when the communication by the communicator with the communication counterpart is reset due to the second cause, the communication controller causes the communicator to resume the communication with the communication counterpart using, from among the first communication mode and the second communication mode, one communication mode that is in use when the communication by the communicator is reset, without the communication controller executing the determination processing.

4. The communication device according to claim 1, wherein
the communication controller comprises a system configuration determiner configured to determine a system configuration of the communication counterpart via the communication by the communicator using the second communication mode when the communication by the communicator with the communication counterpart using the second communication mode is reset due to the first cause, and
the communication controller determines that the communication with the communication counterpart using the second communication mode is acceptable when the system configuration determiner successfully determines the system configuration of the communication counterpart.

5. The communication device according to claim 4, wherein
the system configuration determiner determines the system configuration of the communication counterpart via a communication by the communicator using the first communication mode when the system configuration determiner is unsuccessful in determining the system configuration of the communication counterpart via the communication using the second communication mode,
the communication controller further comprises a communication mode determiner configured to determine whether or not the communication counterpart supports the second communication mode via the communication by the communicator using the first communication mode after the system configuration determiner determines the system configuration of the communication counterpart via the communication using the first communication mode, and
the communication controller determines that the communication with the communication counterpart using the second communication mode is acceptable when a determination that the communication counterpart supports the second communication mode is made by the communication mode determiner.

6. The communication device according to claim 1, wherein
the communication controller comprises:
a system configuration determiner configured to, when the communication by the communicator with the communication counterpart using the second communication mode is reset due to the first cause, (i) transmit to the communication counterpart, via the communication by the communicator using the second communication mode, a request to switch the communication mode to the first communication mode and then (ii) determine a system configuration of the communication counterpart via the communication by the communicator using the first communication mode; and
a communication mode determiner configured to, via the communication by the communicator using the first communication mode, determine whether or not the communication counterpart supports the second communication mode after the system configuration determiner determines the system configuration of the communication counterpart via the communication using the first communication mode, and
the communication controller determines that the communication with the communication counterpart using the second communication mode is acceptable when a determination that the communication counterpart supports the second communication mode is made by the communication mode determiner.

7. The communication device according to claim 5, wherein the system configuration determiner determines the system configuration of the communication counterpart via the communication by the communicator using the first communication mode also when the communication by the communicator with the communication counterpart using the first communication mode is reset due to the first cause.

8. The communication device according to claim 5, wherein
the communicator communicates with a plurality of communication counterparts including the communication counterpart using the first communication mode or the second communication mode,
the communication mode determiner, via the communication by the communicator with each of the communication counterparts using the first communication mode, determines whether or not each of the communication counterparts supports the second communication mode, and
the communication controller determines that a communication with each of the communication counterparts using the second communication mode is acceptable when a determination that all of the communication counterparts support the second communication mode is made by the communication mode determiner.

9. The communication device according to claim 1, further comprising a reset cause determiner configured to determine, based on a power supply voltage of the communication device, whether the communication by the communicator is reset due to the first cause or is reset due to the second cause.

10. The communication device according to claim 9, wherein the reset cause determiner determines that the communication by the communicator is reset due to the first cause when the power supply voltage at timing of reset of the communication by the communicator is less than a specified value, and determines that the communication by the communicator is reset due to the second cause when the power supply voltage at the timing of reset of the communication by the communicator is greater than or equal to the specified value.

11. The communication device according to claim 9, wherein the reset cause determiner determines that the communication by the communicator is reset due to the first cause when the power supply voltage does not reach or exceed a specified value before elapsing of a specified time duration after the power supply voltage drops below the specified value, and determines that the communication by the communicator is reset due to the second cause when the power supply voltage reaches or exceeds the specified value before elapsing of the specified time duration after the power supply voltage drops below the specified value.

12. The communication device according to claim 1, wherein the second communication mode is a communication mode having a communication speed that is faster than that of the first communication mode.

13. The communication device according to claim 1, wherein the communication device is an outdoor unit of an air-conditioning system and the communication counterpart is an indoor unit of the air-conditioning system.

14. A communication system comprising:
the communication device according to claim 1; and
the communication counterpart, wherein
the communication counterpart comprises a second communicator configured to communicate with the communication device using the first communication mode or the second communication mode.

15. The communication system according to claim 14, wherein
the communication counterpart further comprises a second communication controller, and
when a communication by the second communicator with the communication device using the second communication mode is reset due to the first cause, and
if the communication with the communication device using the second communication mode is acceptable, the second communication controller causes the second communicator to resume the communication with the communication device using the second communication mode, and
if the communication with the communication device using the second communication mode is unacceptable, the second communication controller causes the second communicator to start a communication with the communication device using the first communication mode, and
when the communication by the second communicator with the communication device using the second communication mode is reset due to the second cause, the second communication controller causes the second communicator to resume the communication with the communication device using the second communication mode.

16. The communication system according to claim 15, wherein the second communication controller causes the second communicator to resume the communication with the communication device using the first communication mode when the communication by the second communicator with the communication device using the first communication mode is reset due to the first cause or is reset due to the second cause.

17. The communication system according to claim 15, wherein the second communication controller determines that the communication with the communication device using the second communication mode is acceptable when information, indicating that the communication using the second communication mode is acceptable, is received from the communication device after the communication by the second communicator with the communication device using the second communication mode is reset due to the first cause.

18. A communication method, comprising:
communicating with a communication counterpart using a second communication mode,
resuming a communication with the communication counterpart using the second communication mode when the communication with the communication counterpart using the second communication mode is reset due to a first cause and the communication with the communication counterpart using the second communication mode is acceptable, and starting a communication with the communication counterpart using a first communication mode when the communication with the communication counterpart using the second communication mode is reset due to the first cause and the communication with the communication counterpart using the second communication mode is unacceptable,
resuming the communication with the communication counterpart using the second communication mode when the communication with the communication counterpart using the second communication mode is reset due to a second cause; and
determining that the communication with the communication counterpart using the second communication mode is acceptable
when the communication controller successfully determines a system configuration of the communication counterpart via the communication using the second communication mode, or
when the communication controller successfully determines the system configuration of the communication counterpart via a communication using the first communication mode and the communication counterpart supports the second communication mode,
wherein
the first cause is main power supply of the communication device switching to off, and
the second cause is a drop in power supply voltage of the communication device.

19. A non-transitory computer-readable recording medium storing a program for causing a computer equipped with a communicator configured to communicate with a communication counterpart using a first communication mode or a second communication mode to function as:
a communication controller,
wherein
when a communication by the communicator with the communication counterpart using the second communication mode is reset due to a first cause, and
if the communication with the communication counterpart using the second communication mode is acceptable, the communication controller causes the communicator to resume the communication with the communication counterpart using the second communication mode,
if the communication with the communication counterpart using the second communication mode is unacceptable, the communication controller causes the communicator to start a communication with the communication counterpart using the first communication mode,
when the communication by the communicator with the communication counterpart using the second communication mode is reset due to a second cause, the communication controller causes the communicator to resume the communication with the communication counterpart using the second communication mode, the first cause is main power supply of the communication device switching to off, the second cause is a drop in power supply voltage of the communication device, and the communication controller determines that the communication with the communication counterpart using the second communication mode is acceptable when the communication controller successfully determines a system configuration of the communication counterpart via the communication using the second communication mode, or when the communication controller successfully determines the system configuration of the communication counterpart via a communication using the first communication mode and the communication counterpart supports the second communication mode.

* * * * *